(12) United States Patent
Takezawa et al.

(10) Patent No.: US 11,380,465 B2
(45) Date of Patent: Jul. 5, 2022

(54) RARE EARTH COBALT-BASED PERMANENT MAGNET

(71) Applicants: KYUSHU INSTITUTE OF TECHNOLOGY, Fukuoka (JP); TOKIN Corporation, Sendai (JP)

(72) Inventors: Masaaki Takezawa, Fukuoka (JP); Teruhiko Fujiwara, Sendai (JP); Hiroaki Machida, Sendai (JP); Hideyuki Yoshikawa, Sendai (JP)

(73) Assignees: KYUSHU INSTITUTE OF TECHNOLOGY, Fukuoka (JP); TOKIN Corporation, Sendai (JP)

(*) Notice: Subject to any disclaimer, the term of this patent is extended or adjusted under 35 U.S.C. 154(b) by 790 days.

(21) Appl. No.: 15/761,413

(22) PCT Filed: Oct. 7, 2016

(86) PCT No.: PCT/JP2016/004523
§ 371 (c)(1),
(2) Date: Mar. 19, 2018

(87) PCT Pub. No.: WO2017/061126
PCT Pub. Date: Apr. 13, 2017

(65) Prior Publication Data
US 2020/0243232 A1 Jul. 30, 2020

(30) Foreign Application Priority Data
Oct. 8, 2015 (JP) .............................. JP2015-200085

(51) Int. Cl.
*H01F 1/055* (2006.01)
*C22C 30/02* (2006.01)
(Continued)

(52) U.S. Cl.
CPC .............. *H01F 1/0557* (2013.01); *B22F 3/24* (2013.01); *C22C 30/02* (2013.01);
(Continued)

(58) Field of Classification Search
None
See application file for complete search history.

(56) References Cited

U.S. PATENT DOCUMENTS

| 2002/0054825 A1 | 5/2002 | Sukaki et al. |
| 2005/0173025 A1* | 8/2005 | Iwasaki ................... C22C 38/16 148/103 |

(Continued)

FOREIGN PATENT DOCUMENTS

| CN | 103021621 A | 4/2013 |
| CN | 104916382 A | 9/2015 |

(Continued)

OTHER PUBLICATIONS

ISA Japan Patent Office, International Search Report Issued in Application No. PCT/JP2016/004523, dated Dec. 6, 2016, WIPO, 4 pages.

(Continued)

*Primary Examiner* — Anthony M Liang
(74) *Attorney, Agent, or Firm* — McCoy Russell LLP

(57) ABSTRACT

A rare-earth cobalt permanent magnet with good magnetic properties is provided. A rare-earth cobalt permanent magnet contains 23 to 27 mass % R, 3.5 to 5.0 mass % Cu, 18 to 25 mass % Fe, 1.5 to 3.0 mass % Zr in mass and a remainder Co with inevitable impurities, where an element R is a rare earth element at least containing Sm. The rare-earth cobalt permanent magnet has a metal structure including a plurality of crystal grains and a continuously extending grain boundary. A content of Cu in the grain boundary is higher than a content of Cu in the crystal grains, and a content of Zr in the (Continued)

grain boundary is higher than a content of Zr in the crystal grains.

16 Claims, 19 Drawing Sheets

(51) Int. Cl.
    *B22F 3/24*     (2006.01)
    *H01F 41/02*     (2006.01)
    *H02K 1/02*     (2006.01)

(52) U.S. Cl.
    CPC .... *H01F 41/0266* (2013.01); *B22F 2003/248* (2013.01); *B22F 2301/45* (2013.01); *C22C 2202/02* (2013.01); *H02K 1/02* (2013.01)

(56) References Cited

U.S. PATENT DOCUMENTS

| | | |
|---|---|---|
| 2013/0076184 A1 | 3/2013 | Horiuchi et al. |
| 2015/0262740 A1 | 9/2015 | Fujiwara et al. |
| 2016/0155548 A1 | 6/2016 | Horiuchi et al. |
| 2017/0002445 A1 | 1/2017 | Hagiwara et al. |

FOREIGN PATENT DOCUMENTS

| | | |
|---|---|---|
| JP | 2002083727 A | 3/2002 |
| JP | 2014156656 A | 8/2014 |
| JP | WO2015141205 A1 | 9/2015 |
| JP | 5985738 B1 | 8/2016 |
| WO | 2009145229 A1 | 12/2009 |
| WO | 2015141205 A1 | 9/2015 |
| WO | 2016084118 A1 | 6/2016 |

OTHER PUBLICATIONS

State Intellectual Property Office of the People's Republic of China, Office Action and Search Report Issued in Application No. 201680058280.9, dated Jun. 3, 2019, 14 pages. (Submitted with Partial Translation).

Japan Patent Office, Office Action Issued in Application No. 2017-544376, dated Dec. 4, 2018, 20 pages.

* cited by examiner

−400 kA/m

−480 kA/m

−1600 kA/m

0kOe(=0kA/m)

-3kOe (= -238.7kA/m)

-10kOe (= -795.8kA/m)

-12kOe (= -954.9kA/m)

-14kOe (= -1114.1kA/m)

-18kOe (= -1432.4kA/m)

RARE EARTH COBALT-BASED PERMANENT MAGNET

CROSS-REFERENCE TO RELATED APPLICATIONS

The present application is a U.S. National Phase of International Patent Application Serial No. PCT/JP2016/004523, entitled "RARE-EARTH COBALT-BASED PERMANENT MAGNET," filed on Oct. 7, 2016. International Patent Application Serial No. PCT/JP2016/004523 claims priority to Japanese Patent Application No. 2015-200085 filed on Oct. 8, 2015. The entire contents of each above-cited applications are hereby incorporated by reference in their entirety for all purposes.

TECHNICAL FIELD

The present invention relates to a rare earth-cobalt permanent magnet.

BACKGROUND ART

Examples of rare earth-cobalt permanent magnets include a samarium-cobalt magnet that contains 14.5 mass % Fe. Further, a samarium-cobalt magnet with an increased Fe content is made to improve the energy product.

For example, the samarium-cobalt magnet obtained using an alloy consisting of 20 to 30 mass % RE (RE is Sm or two or more kinds of rare earth elements containing 50 mass % or more Sm), 10 to 45 mass % Fe, 1 to 10 mass % Cu, 0.5 to 5 mass % Zr, and the remainder Co with inevitable impurities is disclosed in Patent Literature 1. To be specific, strip casting is used to cast the alloy and obtain a thin piece. The strip casting is a method that drops the molten alloy onto a water-cooled copper roll so as to produce a thin piece with a thickness of about 1 mm. Then, the obtained thin piece is placed in a non-oxidizing atmosphere and heat-treated, and then ground into powder. The powder is then compression-molded in a magnetic field and then undergoes sintering, solution treatment and ageing treatment in this order.

CITATION LIST

Patent Literature

PTL1: Japanese Unexamined Patent Application Publication No. 2002-083727

SUMMARY OF INVENTION

Technical Problem

There is a demand for a rare earth-cobalt permanent magnet with good magnetic properties.

The present invention provides a rare earth-cobalt permanent magnet with good magnetic properties.

Solution to Problem

A rare earth-cobalt permanent magnet according to an embodiment of the present invention contains 23 to 27 mass % R, 3.5 to 5.0 mass % Cu, 18 to 25 mass % Fe, 1.5 to 3.0 mass % Zr, and a remainder Co with inevitable impurities, where an element R is a rare earth element at least containing Sm, and the rare earth-cobalt permanent magnet has a metal structure including a plurality of crystal grains and a grain boundary, the grain boundary has a continuously extending shape, a content of Cu in the grain boundary is higher than a content of Cu in the crystal grains, and a content of Zr in the grain boundary is higher than a content of Zr in the crystal grains.

The grain boundary may contain 5 to 45 mass % Cu and 3 to 20 mass % Zr. Further, when a specified applied magnetic field is applied in a demagnetizing field and the applied magnetic field is gradually increased, a magnetic wall may come into existence in a boundary between the plurality of crystal grains, and when the applied magnetic field continues to be gradually increased and the applied magnetic field exceeds a critical magnetic field, the magnetic wall may propagate into the crystal grain, and the critical magnetic field may be equal to or more than 480 kA/m. Further, an inherent coercive force may be equal to or more than 1600 kA/m. Further, among inevitable impurities, C may be restricted to 200 to 1000 ppm. Further, among inevitable impurities, O may be restricted to 1000 to 5000 ppm. Further, a density may be equal to or more than 8.25 g/cm$^3$, and a maximum energy product may be equal to or more than 255 kJ/m$^3$.

A motor according to an embodiment of the present invention includes the rare earth-cobalt permanent magnet described above.

A device according to an embodiment of the present invention includes the rare earth-cobalt permanent magnet described above.

A method of producing a rare earth-cobalt permanent magnet according to an embodiment of the present invention is a method of producing a rare earth-cobalt permanent magnet containing 23 to 27 mass % R, 3.5 to 5.0 mass % Cu, 18 to 25 mass % Fe, 1.5 to 3.0 mass % Zr, and a remainder Co with inevitable impurities, where an element R is a rare earth element at least containing Sm, the rare earth-cobalt permanent magnet having a metal structure including a plurality of crystal grains and a grain boundary, the grain boundary having a continuously extending shape, a content of Cu in the grain boundary being higher than a content of Cu in the crystal grains, and a content of Zr in the grain boundary being higher than a content of Zr in the crystal grains, the method including a sintering step of, after grinding an ingot into powder and press-molding the powder into a molded body, sintering the molded body, a solution treatment step of performing solution treatment by heating and holding the molded body under the same atmosphere conditions as in the sintering step, and a rapid cooling step of rapidly cooling the molded body, and the method further including, before the sintering step, a material combining step of combining materials including a master alloy containing Zr, and a casting step of forming an ingot by metal mold casting.

A method of producing a rare earth-cobalt permanent magnet according to an embodiment of the present invention is a method of producing a rare earth-cobalt permanent magnet containing 23 to 27 mass % R, 3.5 to 5.0 mass % Cu, 20 to 25 mass % Fe, 1.5 to 3.0 mass % Zr, and a remainder Co with inevitable impurities, where an element R is a rare earth element at least containing Sm, the rare earth-cobalt permanent magnet having a metal structure including a plurality of crystal grains and a grain boundary, the grain boundary having a continuously extending shape, a content of Cu in the grain boundary being higher than a content of Cu in the crystal grains, and a content of Zr in the grain boundary being higher than a content of Zr in the crystal grains, the method including a sintering step of, after grinding an ingot into powder and press-molding the powder into a molded body, sintering the molded body by heating and holding the molded body at a sintering temperature of 1175° C. to 1225° C. for a sintering time of 20 to 180 minutes under an atmosphere with a degree of vacuum of 10 Pa or lower, a solution treatment step of performing solution treatment by heating and holding the molded body at a solution temperature of 1130° C. to 1180° C. for a solution time of 2 to 30 hours under the same atmosphere as in the sintering step, and a rapid cooling step of rapidly cooling the molded body at a rapid cooling rate of 60° C./min or higher.

Advantageous Effects of Invention

According to the embodiments of the present invention, it is possible to provide a rare earth-cobalt permanent magnet with good magnetic properties.

DESCRIPTION OF EMBODIMENTS

The present inventors have found that the magnetic domain structure of a permanent magnet affects magnetic properties such as squareness. The present inventors have made intensive studies on raw materials, a production method and the like and have accomplished the present invention.

First Embodiment

Figure 1:
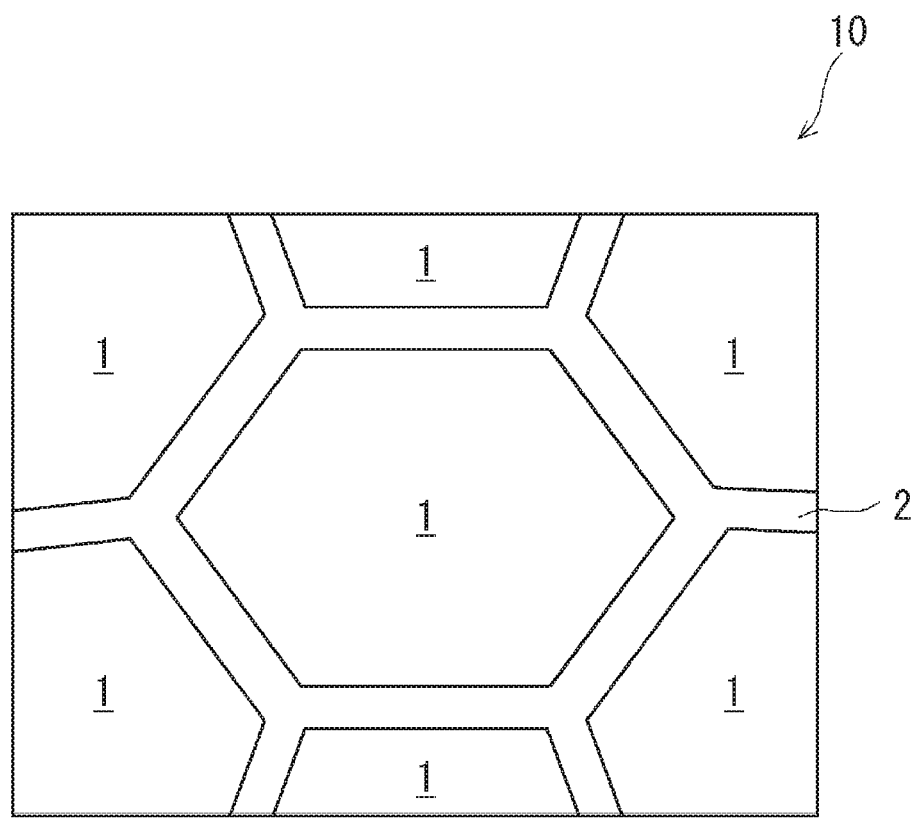
FIG. 1 is a view schematically showing a sectional structure of an example of a rare earth-cobalt permanent magnet according to a first embodiment.

A rare earth-cobalt permanent magnet according to a first embodiment is described hereinafter with reference to FIG. 1. FIG. 1 is a view schematically showing the sectional structure of an example of the rare earth-cobalt permanent magnet according to the first embodiment.

The rare earth-cobalt permanent magnet according to the first embodiment contains 24 to 26 mass % R, 18 to 22 mass % Fe, 4.2 to 5.0 mass % Cu, 2.0 to 2.6 mass % Zr, and the remainder Co with inevitable impurities. The melting point of the rare earth-cobalt permanent magnet according to the first embodiment is about 1400° C. R is a rare earth element and at least contains Sm among rare earth elements. Examples of rare earth elements include Pr, Nd, Ce and La. Further, the rare earth-cobalt permanent magnet according to the first embodiment contains an intermetallic compound that is composed predominantly of rare earth cobalt. The intermetallic compound may be, for example, $SmCo_5$, $Sm_2Co_{17}$ or the like.

Further, an example of the rare earth-cobalt permanent magnet according to the first embodiment is a rare earth-cobalt permanent magnet 10. As shown in FIG. 1, the rare earth-cobalt permanent magnet 10 has a metal structure containing a plurality of crystal grains 1 and a grain boundary 2 at the boundary between the plurality of crystal grains 1 (which may be referred to as a crystal grain boundary).

The crystal grains 1 have a cell phase containing $Sm_2Co_{17}$ (not shown), a cell wall surrounding the cell phase and containing $SmCo_5$ (not shown), and a plate phase containing Zr (not shown). Further, in the rare earth-cobalt permanent magnet 10, a structure in a sub-micron size is formed inside the crystal grain 1, a difference between a concentration of an alloy composition in the cell phase and that in the cell wall arises, and Cu is concentrated on the cell wall in particular.

The grain boundary 2 contains a higher proportion of at least one of Cu and Zr than the crystal grains 1 does. Further, the content of Cu in the grain boundary 2 may be higher than or the same as the content of Cu in the whole rare earth-cobalt permanent magnet 10; in other words, the grain boundary 2 preferably contains 5.0 mass % or more Cu. Further, the content of Zr in the grain boundary 2 is higher than the content of Zr in the whole rare earth-cobalt permanent magnet 10; in other words, the grain boundary 2 preferably contains 2.6 mass % or more Zr and more preferably contains 3.0 mass % or more Zr.

Further, the grain boundary 2 is a continuously extending filmy body. To be more specific, the grain boundary 2 is preferably formed like a film so as to cover the plurality of crystal grains 1. Further, in a specific example, the grain boundary 2 has a shape where a plurality of film-like members that respectively cover the plurality of crystal grains 1 are connected with one another. In another specific example, the grain boundary 2 covers each of the plurality of crystal grains 1 and divides the plurality of crystal grains 1 from one another.

The permanent magnet according to the first embodiment can be widely used as various parts and devices of a clock, an electric motor, a measuring instrument, telecommunication equipment, a computer terminal, a speaker, a video disk, a sensor and other equipment. Further, because the magnetic force of the permanent magnet according to the first embodiment resists being degraded even under a high ambient temperature, it is expected that it can be applied to an angle sensor, an ignition coil used in a vehicle engine room, a drive motor of HEV (Hybrid electric vehicle) and the like.

Method of Producing Permanent Magnet According to First Embodiment

Figure 2:
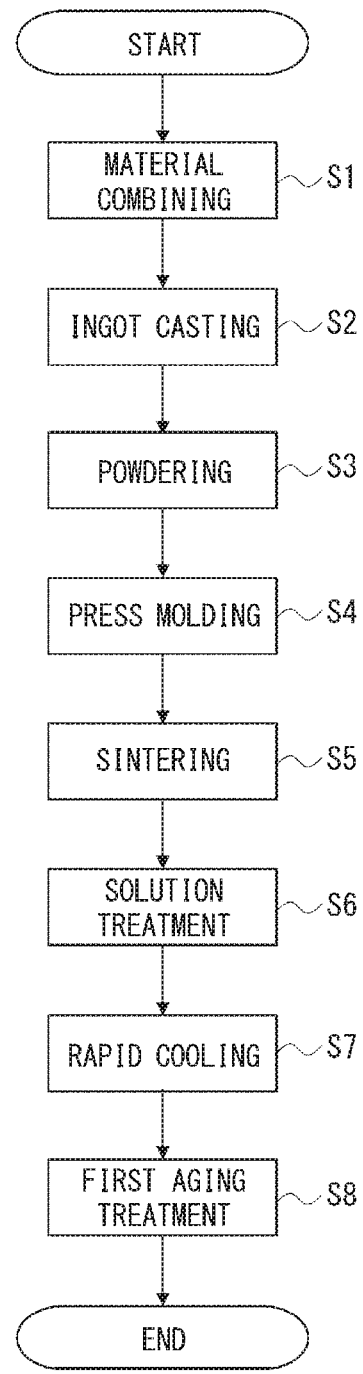
FIG. 2 is a flowchart showing an example of a method of producing the rare earth-cobalt permanent magnet according to the first embodiment.

A method of producing the permanent magnet according to the first embodiment is described hereinafter with reference to FIG. 2. FIG. 2 is a flowchart showing an example of a method of producing the rare earth-cobalt permanent magnet according to the first embodiment.

First, a rare earth element, pure Fe, pure Cu, pure Co, and a master alloy containing Zr are prepared as raw materials, and those materials are combined in the above-described specified composition (material combining step S1). The master alloy is a binary alloy that generally consists of two different metal elements and is used as a dissolving material. Further, the master alloy containing Zr has a component composition with a melting point lower than 1852° C., the melting point of pure Zr. The melting point of the master alloy containing Zr is preferably equal to or lower than the temperature that dissolves the rare earth-cobalt permanent magnet according to the first embodiment, which temperature is 1600° C. or lower, and more preferably 1000° C. or lower.

Examples of the master alloy containing Zr include FeZr alloy and CuZr alloy. The FeZr alloy and CuZr alloy are preferable because they have a low melting point and therefore Zr is dispersed uniformly throughout an ingot structure, which is described later. Accordingly, the FeZr alloy and CuZr alloy having an eutectic composition or a similar composition are preferable because the melting point is suppressed to be 1000° C. or lower. To be specific, the FeZr alloy is, for example, 20% Fe-80% Zr alloy. The 20% Fe-80% Zr alloy contains 75 to 85 mass % Zr and the remainder Fe with inevitable impurities. The CuZr alloy is, for example, 50% Cu-50% Zr alloy. The 50% Cu-50% Zr alloy contains 45 to 55 mass % Zr and the remainder Cu with inevitable impurities.

Then, the combined materials are charged into an alumina crucible, dissolved by a high-frequency furnace under a vacuum atmosphere or under an inert gas atmosphere with $1 \times 10^{-2}$ Torr or less, and then casted into a metal mold, thereby obtaining an ingot (ingot casting step S2). The casting method is, for example, metal mold casting called book molding. Note that the obtained ingot may be heat-treated for about 1 to 20 hours at a solution temperature. By this heat treatment, the structure of the ingot is further homogenized, which is preferable.

Then, the obtained ingot is ground into powder having a specified average particle diameter (powdering step S3). Typically, the obtained ingot is coarsely ground, and further the coarsely ground ingot is finely ground into powder in an inert gas atmosphere by using a jet mill or the like. The average particle diameter (d50) of the powder is, for example, 1 to 10 μm. Note that the average particle diameter (d50) is a particle diameter at an integrated value 50% in the particle size distribution obtained by the laser diffraction and scattering method, and, to be more precise, the particle diameter is the Feret's diameter.

After that, the obtained powder is placed in a certain magnetic field, and then the powder is pressurized vertically to the magnetic field and press-molded, thereby obtaining a molded body (press molding step S4). The press molding conditions are, for example, a magnetic field of 15 kOe or higher, and a pressure value of press molding of 0.5 to 2.0 ton/cm² (=49 to 196 MPa). Note that, according to a product, a magnetic field may be equal to or less than 15 kOe (=1193.7 kA/m), and the above-described power may be pressurized parallelly to the magnetic field and press-molded. The conversion between non-SI units and SI units may be done using the following conversion formulas 1 to 4.

$1[kOe] = 10^3/4\pi[kA/m]$ (Conversion formula 1)

$1[MGOe] = 10^2/4\pi[kJ/m^3]$ (Conversion formula 2)

$1.0[ton/cm^2] = 98.0665 [MPa]$ (Conversion formula 3)

$1.0 [Torr] = 1330.32 [Pa]$ (Conversion formula 4)

Then, the molded body is heated to a sintering temperature under a vacuum atmosphere or under an inert gas atmosphere with $1 \times 10^{-2}$ Torr (=1.3332 Pa) or less and thereby sintered (sintering step S5). The sintering temperature is, for example, 1150° C. to 1250° C.

Then, the molded body is solution-treated at a solution temperature that is lower than the sintering temperature by 20° C. to 50° C. under the same atmosphere condition (solution treatment step S6). The solution time, for example, is 2 to 10 hours. Note that the solution time may be varied appropriately according to the structure of the obtained molded body and the target magnetic properties. If the solution time is too short, the component composition is not sufficiently homogenized. On the other hand, if the solution time is too long, Sm contained in the molded body evaporates. This produces a difference between the component composition of the inside of the molded body and that of the surface thereof, which can cause the degradation of the magnetic properties of the permanent magnet.

Note that it is preferred to perform the sintering step S5 and the solution treatment step S6 in succession from a mass production point of view. In the case of performing the sintering step S5 and the solution treatment step S6 in succession, the temperature is dropped from the sintering temperature to the solution temperature at a low temperature drop rate of, for example, 0.2° C. to 5° C./min. It is preferred that the temperature drop rate be low because Zr is more surely dispersed throughout the metal structure of the molded body and thus evenly distributed.

Then, the solution-treated molded body is rapidly cooled at a cooling rate of 300° C./min or higher (rapid cooling step S7). Further, under the same atmosphere condition, the molded body is heated and held for one hour or more at a temperature of 700° C. to 870° C., and consecutively cooled at a cooling rate of 0.2° C. to 5° C./min until it falls down to at least 600° C. or preferably to 400° C. or lower (first aging treatment step S8).

By the above process, the rare earth-cobalt permanent magnet according to the first embodiment is obtained.

In the meantime, metal mold casting enables casting with a simple device, compared with strip casting that requires a complex device such as a water-cooled copper roll. According to the first embodiment, it is possible to produce a permanent magnet by using metal mold casting. It is thus possible to produce a permanent magnet having good magnetic properties with use of a simple device.

Further, the density of the rare earth-cobalt permanent magnet according to the first embodiment tends to fall within the range of 8.15 to 8.39 g/cm$^3$ by use of metal mold casting. The average crystal grain diameter of the rare earth-cobalt permanent magnet according to the first embodiment tends to fall within the range of 40 to 100 μm by use of metal mold casting.

On the other hand, there is a permanent magnet that is produced by the same production method as that by which the rare earth-cobalt permanent magnet according to the first embodiment is produced, except for using strip casting, instead of metal mold casting, in the ingot casting step S2. The density of this permanent magnet is higher than the density of the rare earth-cobalt permanent magnet according to the first embodiment, and it tends to be 8.40 g/cm$^3$ or higher to be more precise. Further, the average crystal grain diameter of this permanent magnet tends to be smaller than 40 μm.

Second Embodiment

Figure 15:
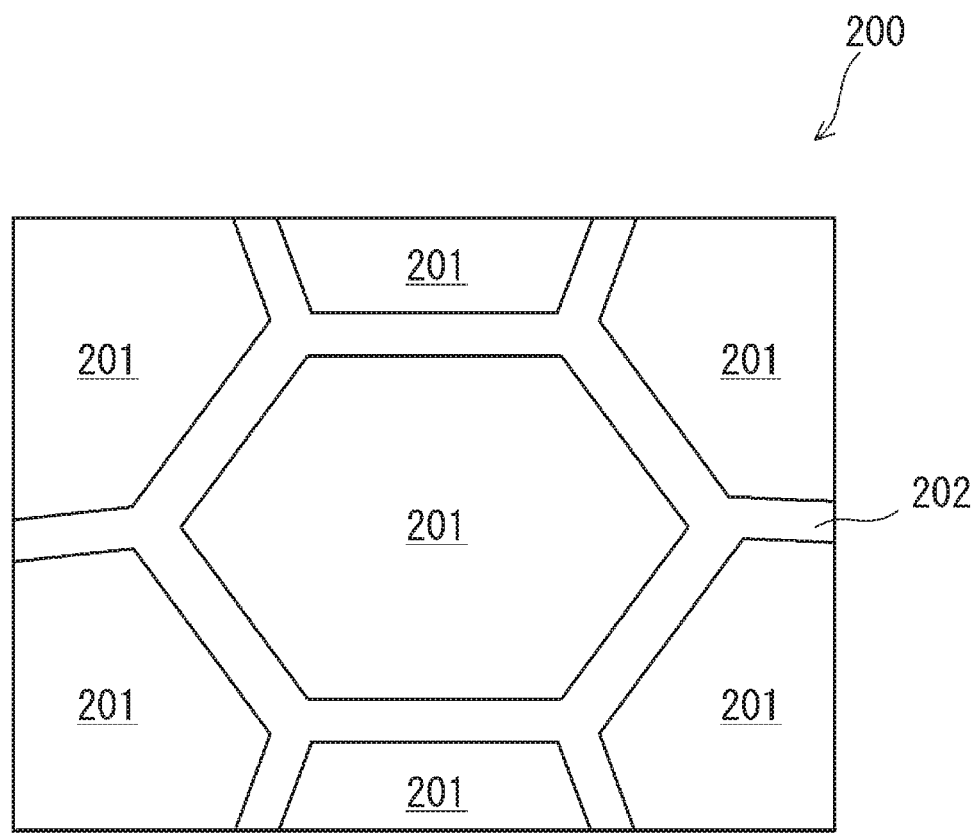
FIG. 15 is a view schematically showing a sectional structure of an example of a rare earth-cobalt permanent magnet according to a second embodiment.

A rare earth-cobalt permanent magnet according to a second embodiment is described hereinafter with reference to FIG. 15. FIG. 15 is a view schematically showing the sectional structure of an example of the rare earth-cobalt permanent magnet according to the second first embodiment.

The rare earth-cobalt permanent magnet according to the second embodiment contains 23 to 27 mass % R, 20 to 25 mass % Fe, 3.5 to 5.0 mass % Cu, 1.5 to 3.0 mass % Zr, and the remainder Co with inevitable impurities. The melting point of the rare earth-cobalt permanent magnet according to the second embodiment is about 1400° C. R is a rare earth element and at least contains Sm among rare earth elements. Examples of rare earth elements include Pr, Nd, Ce and La. Further, the rare earth-cobalt permanent magnet according to the second embodiment contains an intermetallic compound that is composed predominantly of rare earth cobalt. The intermetallic compound may be, for example, SmCo$_5$, Sm$_2$Co$_{17}$ or the like.

Further, an example of the rare earth-cobalt permanent magnet according to the second embodiment is a rare earth-cobalt permanent magnet 200. As shown in FIG. 15, the rare earth-cobalt permanent magnet 200 has a metal structure containing a plurality of crystal grains 201 and a grain boundary 202 at the boundary between the plurality of crystal grains 201 (which may be referred to as a crystal grain boundary).

The crystal grains 201 have a cell phase containing Sm$_2$Co$_{17}$ (not shown), a cell wall surrounding the cell phase and containing SmCo$_5$ (not shown), and a plate phase containing Zr (not shown). Further, in the rare earth-cobalt permanent magnet 200, a structure in a sub-micron size is formed inside the crystal grain 201, a difference between a concentration of an alloy composition in the cell phase and that in the cell wall arises, and Cu is concentrated on the cell wall in particular.

The grain boundary 202 contains a higher proportion of at least one of Cu and Zr than the crystal grains 201 does. Further, the content of Cu in the grain boundary 202 may be higher than or the same as the content of Cu in the whole rare earth-cobalt permanent magnet 200; in other words, the grain boundary 202 preferably contains 5.0 mass % or more Cu, and it may, for example, contain 45.0 mass % Cu. Further, the content of Zr in the grain boundary 202 is higher than the content of Zr in the whole rare earth-cobalt permanent magnet 200; in other words, the grain boundary 202 preferably contains 2.6 mass % or more Zr, more preferably contains 3.0 mass % or more Zr, still more preferably contains 6.0 mass % or more Zr, and it may contain, for example, 20.0 mass % Zr.

Further, the grain boundary 202 is a continuously extending filmy body. To be more specific, the grain boundary 202 is preferably formed like a film so as to cover the plurality of crystal grains 201. Further, in a specific example, the grain boundary 202 has a shape where a plurality of film-like members that respectively cover the plurality of crystal grains 201 are connected with one another. In another specific example, the grain boundary 202 covers each of the plurality of crystal grains 201 and divides the plurality of crystal grains 201 from one another.

A specific example of the rare earth-cobalt permanent magnet 200 has a density of 8.25 g/cm$^3$ or more, a maximum energy product (BH)max of 255 kJ/m$^3$ or more, and a coercive force (inherent coercive force) Hcj of 1600 kA/m or more.

The permanent magnet according to the second embodiment can be widely used as various parts and devices of a clock, an electric motor, a measuring instrument, telecommunication equipment, a computer terminal, a speaker, a video disk, a sensor and other equipment. Further, because the magnetic force of the permanent magnet according to the second embodiment resists being degraded even under high ambient temperature, application to an angle sensor, an ignition coil used in a vehicle engine room, a drive motor of HEV (Hybrid electric vehicle) and the like is expected.

Method of Producing Permanent Magnet According to Second Embodiment

Figure 16:
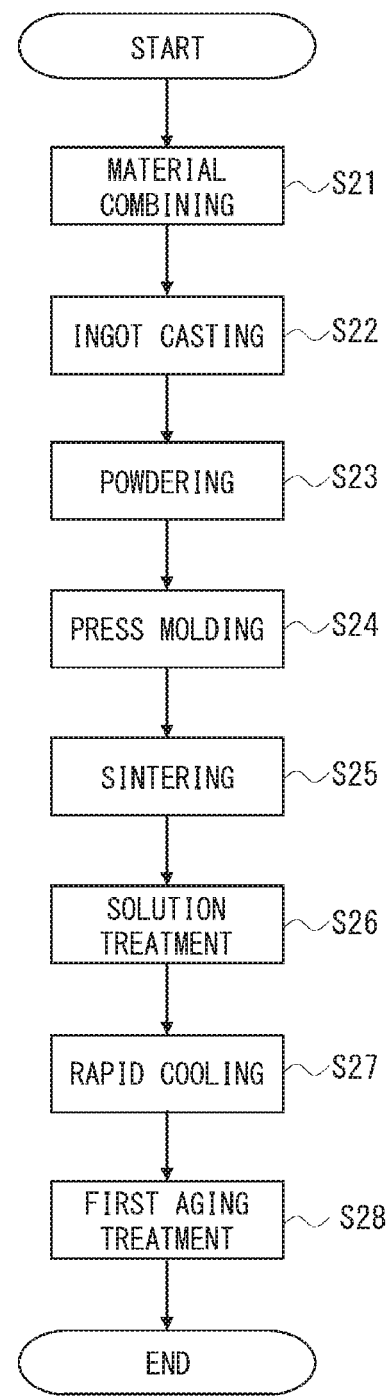
FIG. 16 is a flowchart showing an example of a method of producing the rare earth-cobalt permanent magnet according to the second embodiment.

A method of producing the permanent magnet according to the second embodiment is described hereinafter with reference to FIG. 16. FIG. 16 is a flowchart showing an example of a method of producing the rare earth-cobalt permanent magnet according to the second embodiment.

First, a rare earth element, pure Fe, pure Cu, pure Co, and a master alloy containing Zr are prepared as raw materials, and those materials are combined in the above-described specified composition (material combining step S21). As described above, the specified composition contains 23 to 27 mass % R, 20 to 25 mass % Fe, 3.5 to 5.0 mass % Cu, 1.5 to 3.0 mass % Zr, and the remainder Co. The specified composition preferably contains 24 to 26 mass % R, 20 to 25 mass % Fe, 4.0 to 5.0 mass % Cu, 2.0 to 2.5 mass % Zr, and the remainder Co. For the master alloy containing Zr, it is preferred to use the same kind of alloy as the alloy used in the material combining step S1 (see FIG. 2).

Then, the combined materials are charged into an alumina crucible, dissolved by a high-frequency furnace under a vacuum atmosphere or under an inert gas atmosphere with $1 \times 10^{-2}$ Torr or less, and then casted into a metal mold, thereby obtaining an ingot (ingot casting step S22). The casting method is, for example, metal mold casting called book molding. Note that the obtained ingot may be heat-treated for about 1 to 20 hours at a solution temperature. By this heat treatment, the structure of the ingot is further homogenized, which is preferable.

Then, the obtained ingot is ground into powder having a specified average particle diameter (powdering step S23). Typically, the obtained ingot is coarsely ground into coarse powder. The average particle diameter (d50) of the coarse powder is, for example, 100 to 500 μm. Further, the coarse powder is finely ground into powder in an inert gas atmosphere by using a jet mill or the like. The average particle diameter (d50) of the powder is, for example, 1 to 10 μm. Note that the average particle diameter (d50) is a particle diameter at an integrated value 50% in the particle size distribution obtained by the laser diffraction and scattering method, and the particle diameter is the Feret's diameter, to be more precise.

After that, just like in the press molding step S4 (see FIG. 2), the obtained powder is placed in a certain magnetic field, and then the powder is pressurized vertically to the magnetic field and press-molded, thereby obtaining a molded body (press molding step S24). The press molding conditions are the same as those of the press molding step S4 (see FIG. 2).

Then, the molded body is heated to a sintering temperature under a vacuum atmosphere or under an inert gas atmosphere with 10 Pa or less and thereby sintered (sintering step S25). The sintering temperature is preferably 1175° C. to 1225° C. and more preferably 1180° C. to 1220° C. The sintering time is preferably 20 to 180 minutes and more preferably 30 to 150 minutes. The vacuum atmosphere is preferably less than 1 Pa.

Then, under the same atmosphere condition, the molded body is heated and held for a specified period of time at a solution temperature for solution treatment (solution treatment step S26). The solution temperature is preferably 1130° C. to 1180° C. and more preferably 1140° C. to 1170° C. The solution time is preferably 2 to 30 hours and more preferably 4 to 20 hours. Note that the solution time may be varied appropriately according to the structure of the obtained molded body and the target magnetic properties. If the solution time is longer than 2 hours, the component composition is likely to be homogenized sufficiently. On the other hand, if the solution time is 30 hours or shorter, Sm contained in the molded body is less likely to evaporate. This prevents that a difference in component composition arises between the inside and the surface of the molded body to cause degradation of the magnetic properties as a permanent magnet.

Note that, it is preferred to perform the sintering step S25 and the solution treatment step S26 in succession in terms of mass production. In the case of performing the sintering step S25 and the solution treatment step S26 in succession, the temperature is dropped from the sintering temperature to the solution temperature at a low temperature drop rate of, for example such as 0.2° C. to 5° C./min, for example. It is preferred that the temperature drop rate is low because Zr is more absolutely dispersed throughout the metal structure of the molded body and thus evenly distributed.

Then, the solution-treated molded body is cooled to reduce the temperature of the molded body. The molded body is rapidly cooled at a specified cooling rate in the range where the temperature of the molded body is 1000° C. to 600° C. (rapid cooling step S27). The rapid cooling starts when the temperature of the molded body is dropped to 1000° C. and ends when the temperature of the molded body is dropped to 600° C. The specified cooling rate is 60° C./min or higher, preferably 70° C./min or higher, and more preferably 80° C./min or higher.

Further, under the same atmosphere condition, the molded body is heated and held for 2 to 20 hours at a specified aging temperature, and continuously cooled at a specified cooling rate until it is dropped to at least 400° C. (first aging treatment step S28). The aging temperature is preferably 700° C. to 900° C. and more preferably 800° C. to 850° C. The cooling rate is preferably 2° C./min or lower and more preferably 0.5° C./min or lower.

By the above process, the rare earth-cobalt permanent magnet according to the second embodiment is obtained. It is possible to produce the rare earth-cobalt permanent magnet according to the second embodiment by using metal mold casting, just like the rare earth-cobalt permanent magnet according to the first embodiment. It is thus possible to produce a permanent magnet having good magnetic properties with use of a simple device.

Further, the density of the permanent magnet according to the second embodiment tends to fall within the range of 8.25 to 8.45 g/cm³.

Further, although the molded body is heated to a sintering temperature under a vacuum atmosphere or under an inert gas atmosphere with 10 Pa or less and thereby sintered in the sintering step S25, heat treatment such as SPS (Spark Plasma Sintering: electric discharge sintering) may be carried out.

Examples

Experiment 1

Figure 3:
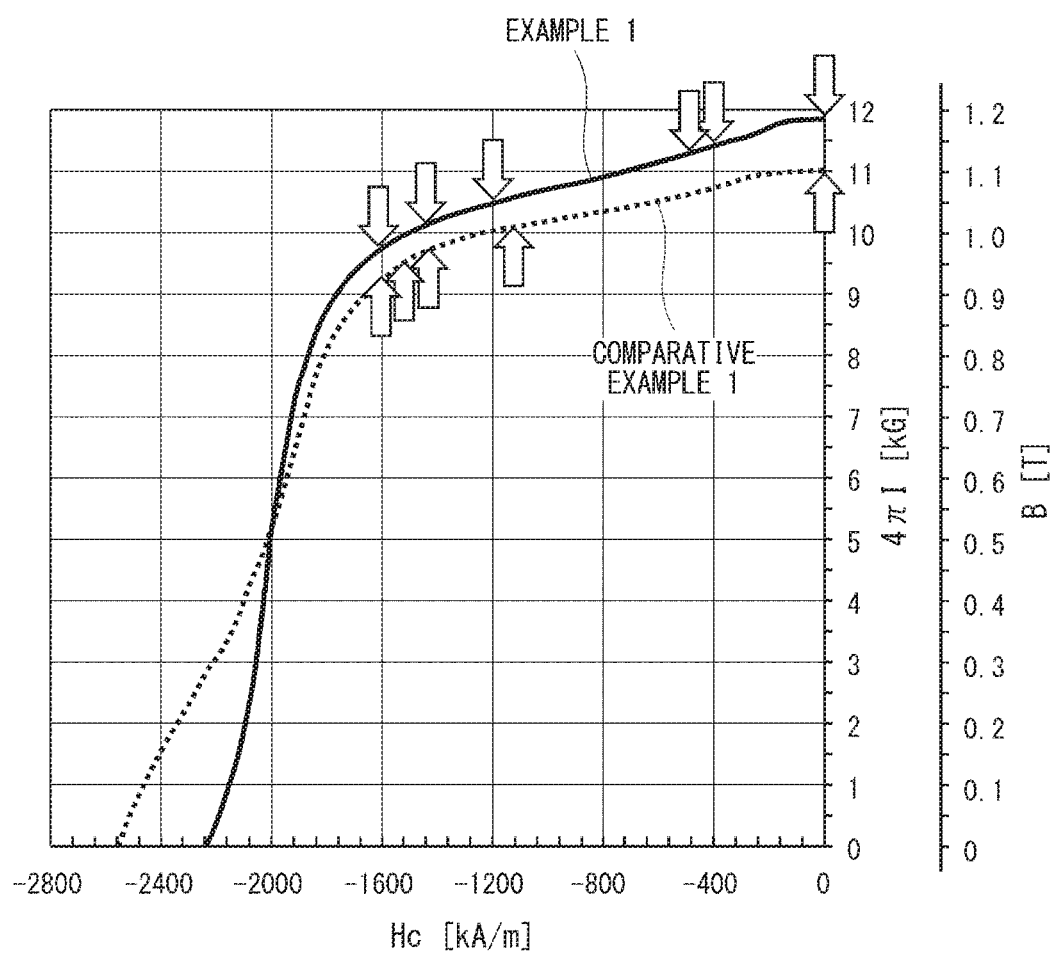
FIG. 3 is a graph showing the relationship between magnetic field strength Hc and magnetic flux density B.
Figure 8:
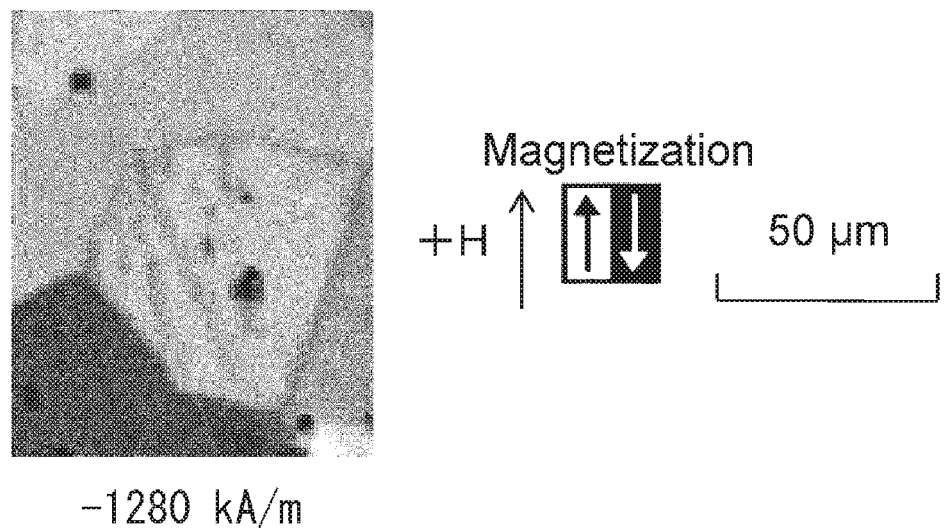
FIG. 8 is an image showing the magnetic domains of the permanent magnet according to the example 1.
Figure 9:
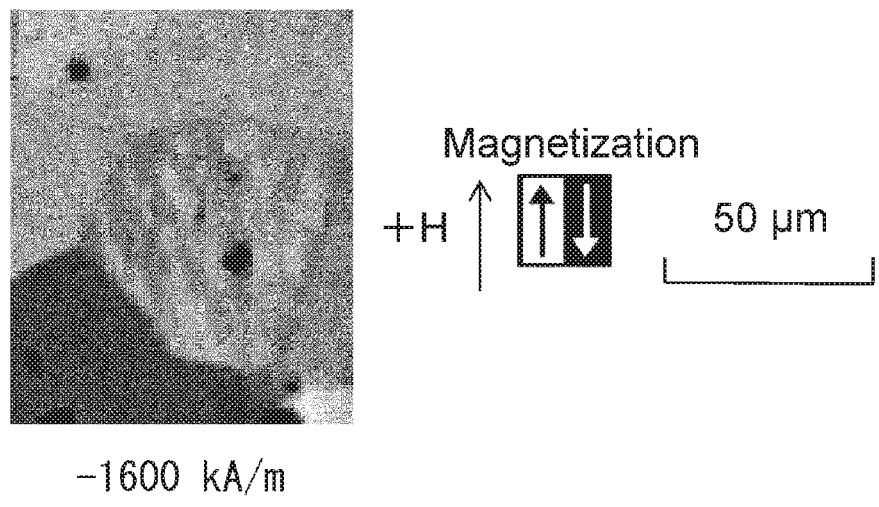
FIG. 9 is an image showing the magnetic domains of the permanent magnet according to the example 1.
Figure 10:
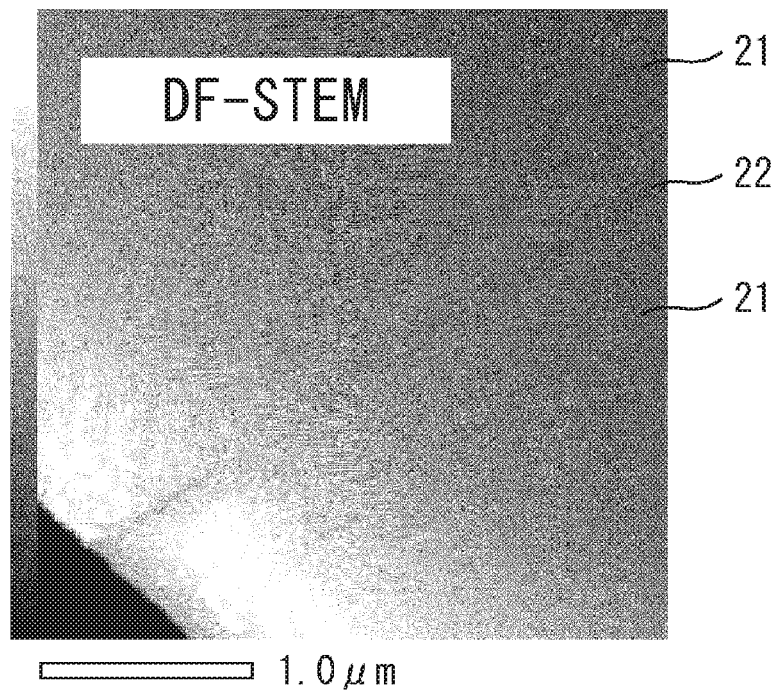
FIG. 10 is an image of the permanent magnet according to the example 1 by DF-STEM.
Figure 26:
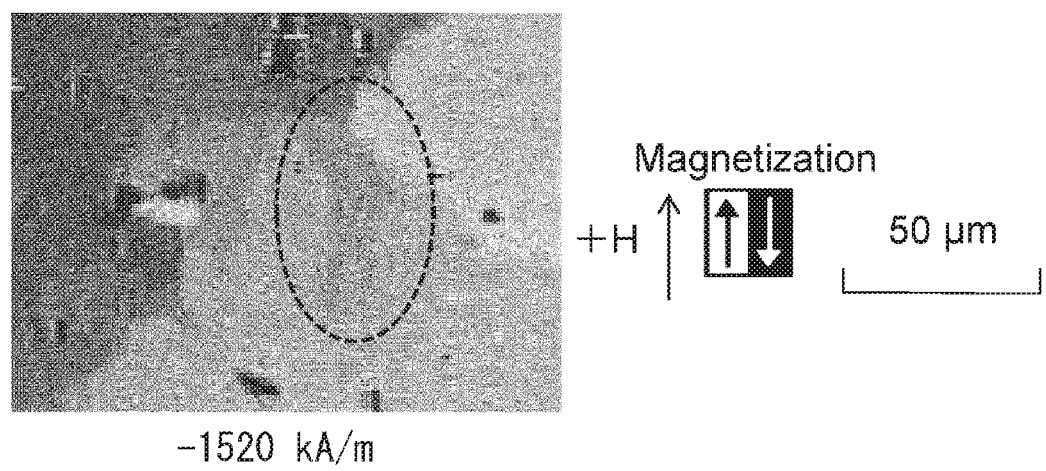
FIG. 26 is an image showing the magnetic domains of the permanent magnet according to the comparative example 1.
Figure 27:
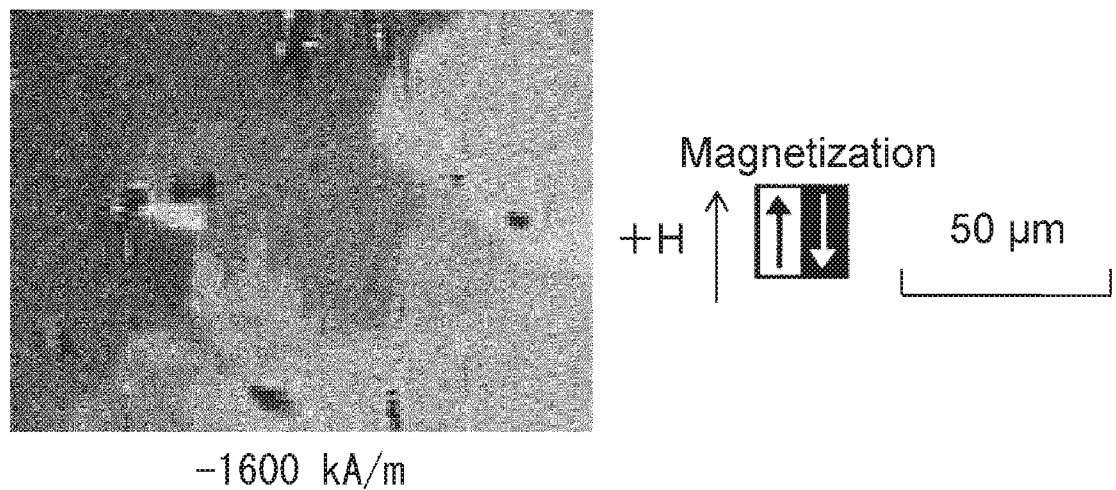
FIG. 27 is an image showing the magnetic domains of the permanent magnet according to the comparative example 1.
Figure 28:
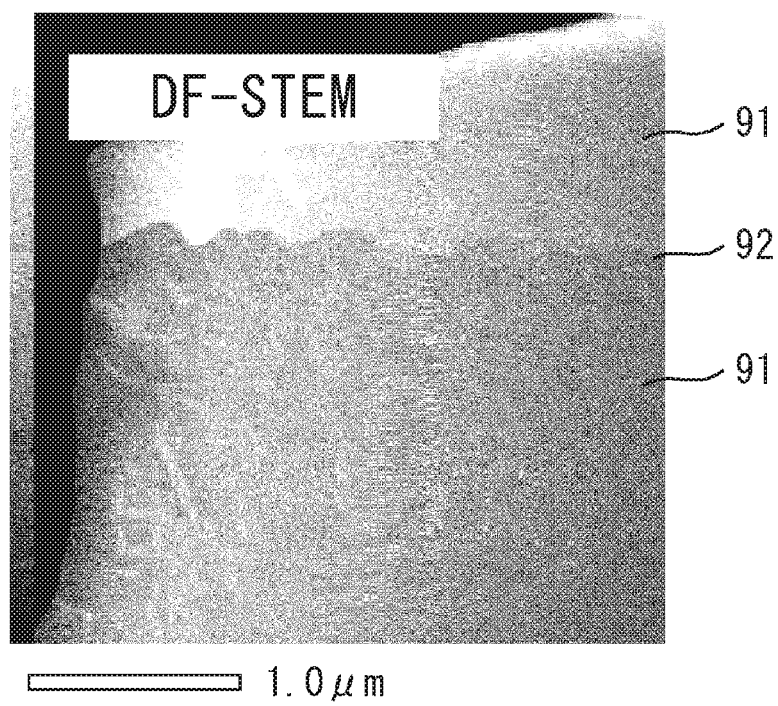
FIG. 28 is an image of the permanent magnet according to the comparative example 1 by DF-STEM.

Hereinafter, experiments conducted for an example 1 regarding the rare earth-cobalt permanent magnet according to the first embodiment and a comparative example 1 are described with reference to Table 1, Table 2, FIGS. 3 to 14, and FIGS. 23 to 32. FIG. 3 is a graph showing the relationship between magnetic field strength Hc and magnetic flux density B. FIGS. 4 to 9 are images showing the magnetic domains of the permanent magnet according to the example 1. FIG. 10 is an image of the permanent magnet according to the example 1 by DF-STEM. FIGS. 11 to 14 are images of the permanent magnet according to the example 1 by elemental mapping. FIGS. 23 to 27 are images showing the magnetic domains of the permanent magnet according to the comparative example 1. FIG. 28 is an image of the permanent magnet according to the comparative example 1 by DF-STEM. FIGS. 29 to 32 are images of the permanent magnet according to the comparative example 1 by elemental mapping.

In the example 1, a rare earth-cobalt permanent magnet was produced by the same method as the method of producing the rare earth-cobalt permanent magnet according to the first embodiment described above (see FIG. 2). To be specific, in the material combining step S1, the target composition was as shown in Table 1.

TABLE 1

|  | Sm mass % | Fe mass % | Cu mass % | Zr mass % | Co mass % |
|---|---|---|---|---|---|
| Example 1 | 25.0 | 20.0 | 4.5 | 2.3 | remainder |
| Comparative Example 1 | 24.5 | 14.5 | 4.5 | 2.3 | remainder |

As the master alloy containing Zr, 20% Fe-80% Zr alloy was used. Further, in the powdering step S3, an ingot was finely ground into powder with an average particle diameter (d50) of 6 μm in an inert gas atmosphere by using a jet mill. In the press molding step S4, press molding was performed under the conditions with a magnetic field of 15 kOe and a press-molding pressure of 1.0 ton/cm$^2$ (=98 MPa), thereby obtaining a plurality of press-molded bodies. In the sintering step S5, sintering was performed at a sintering temperature of 1200° C. In the solution treatment step S6, the temperature was dropped to the solution temperature at a temperature drop rate of 1° C./min, and solution treatment was performed under the conditions with a solution temperature of 1170° C. and a solution treatment time of 4 hours. In the rapid cooling step S7, rapid cooling was performed at a cooling rate of 300° C./min. In the first aging treatment step S8, isothermal aging treatment was performed by heating and holding the sintered body for ten hours at a temperature of 850° C. in the inert gas atmosphere and, after that, continuous aging treatment was performed to 350° C. at a cooling rate of 0.5° C./min, and thereby a permanent magnet was obtained.

Note that, in the comparative example 1, the rare earth-cobalt permanent magnet was produced by the same production method as the production method of the rare earth-cobalt permanent magnet according to the first embodiment described above except for the material combining step S1. In the production method of the comparative example 1, in the step corresponding to the material combining step S1, the materials were combined to achieve the target composition shown in Table 1. Zr metal called zirconium sponge was used instead of 20% Fe-80% Zr alloy.

The magnetic properties in the example 1 and the comparative example 1 were measured. The measured magnetic properties were a magnetic curve, a remanence Br[T], a coercive force (intrinsic coercive force) Hcj [kA/m], a maximum energy product (BH)max[kJ/m$^3$], and squareness Hk/Hcj[%]. The squareness Hk/Hcj indicates the squareness of a demagnetization curve, and a larger value indicates better magnetic properties. Hk is a value of magnetic field strength Hc when B at a remanence Br of 90% and the demagnetization curve intersect. A density was also measured. Measured results are shown in FIG. 3 and Table 2. Further, the magnetic domain structures of the sectional structures in the example 1 and the comparative example 1 were observed by use of an optical microscope using the magnetic Kerr effect. Images by this observation are shown in FIGS. 4 to 9 and FIGS. 23 to 27. Further, the composition (content) of each element in those sectional structures were measured by using DF-STEM/EDX (Dark Field-Scanning Transmission Electron Microscope/Energy Dispersive X-ray Spectroscopy), and elemental mapping was performed. Images by this measurement are shown in FIGS. 10 to 14 and FIGS. 28 to 32.

TABLE 2

|  | Br [T] | Hcj [kA/m] | (BH)max [kJ/m$^3$] | Hk/Hcj [%] | Density [$10^3$ × kg/m$^3$] | Magnetic Wall State (before propagation into crystal grain) |
|---|---|---|---|---|---|---|
| Example 1 | 1.18 | 2300 | 257 | 50 | 8.30 | uniformly distributed in grain boundary |
| Comparative Example 1 | 1.10 | 2600 | 226 | 48 | 8.41 | part of grain boundary |

Evaluation of Magnetic Properties

As shown in Table 2, in the example 1, the remanence Br, the energy product (BH)max and the squareness Hk/Hcj were higher than those in the comparative example 1. One reason would be because the content of Fe was higher than that in the comparative example 1 and the content of Zr was lower than that in the comparative example 1. Another reason would be because, in the example 1, FeZr alloy was used and sufficiently dissolved in the ingot casting step S2, and thereby Zr was evenly distributed in the metal structure; on the other hand, in the comparative example 1, Zr metal called zirconium sponge was used and not sufficiently dissolved compared with the example 1 in the ingot casting step S2, and consequently Zr was unevenly distributed in the metal structure.

Further, in the comparative example 1, the remanence Br was lower while the density was higher than those in the example 1, and therefore the degree of orientation of the crystal axis is considered to be low. One reason is because the average crystal grain diameter was smaller than that in the example 1. It is preferred that the average crystal grain diameter is within the range of 40 to 100 μm because the permanent magnet can have the suitable remanence Br, maximum energy product (BH)max and squareness Hk/Hcj.

Observation of Magnetic Domain Structure

Figure 4:
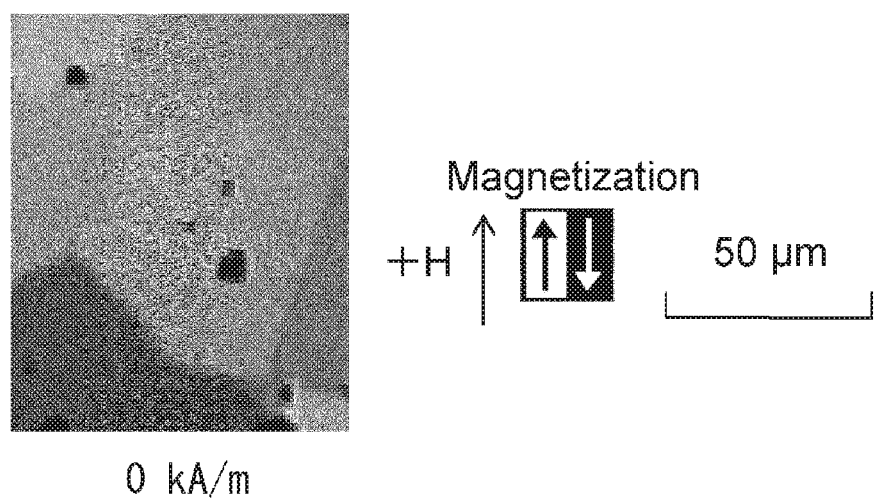
FIG. 4 is an image showing the magnetic domains of a permanent magnet according to an example 1.
Figure 5:
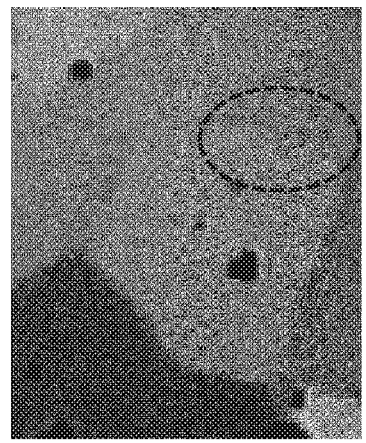
FIG. 5 is an image showing the magnetic domains of the permanent magnet according to the example 1.
Figure 5:
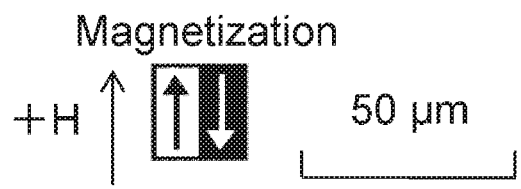
Figure 6:
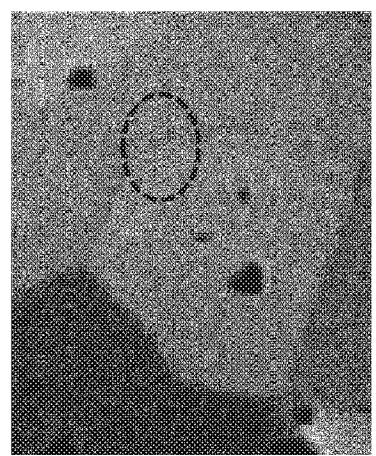
FIG. 6 is an image showing the magnetic domains of the permanent magnet according to the example 1.
Figure 6:
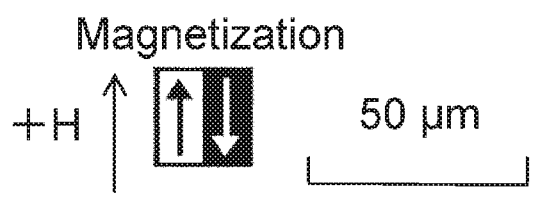
Figure 7:
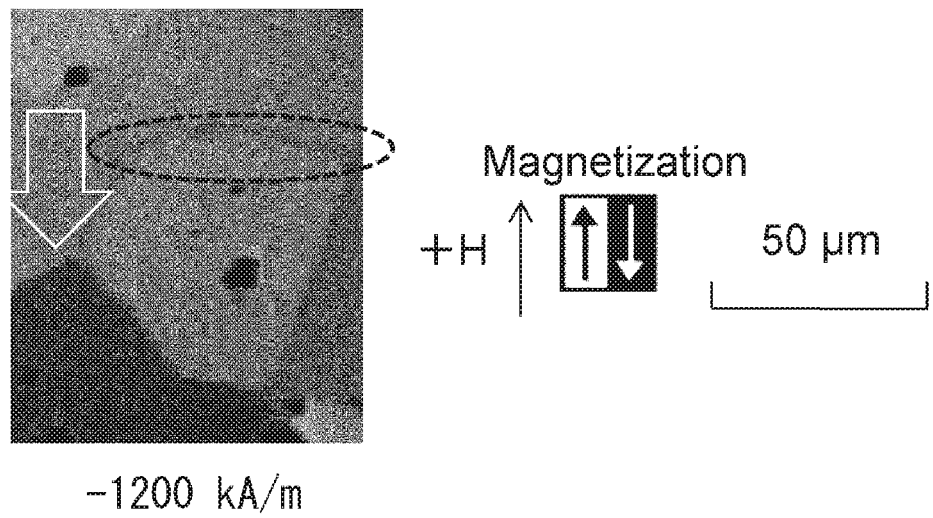
FIG. 7 is an image showing the magnetic domains of the permanent magnet according to the example 1.

The magnetic domain structure of the example 1 was observed by gradually increasing the absolute value of an applied magnetic field in a demagnetizing field. First, as shown in FIG. 4, a magnetic wall that separates a reverse magnetic domain and its surroundings was not found at an applied magnetic field of −0 kA/m. Next, as shown in FIG. 5, it was found that a magnetic wall existed in the crystal grain boundary at an applied magnetic field of −400 kA/m. Then, as shown in FIG. 6, it was found that the magnetic wall existed along the crystal grain boundary at an applied magnetic field of −480 kA/m. After that, as shown in FIG. 7, the magnetic wall moved into the crystal grain (in the direction of the arrow in this example) at an applied magnetic field of −1200 kA/m. Thus, a critical magnetic field that determines whether or not the magnetic wall moves from the crystal grain boundary to the inside of the crystal grain is considered to be in the range of −480 to −1200 kA/m. Then, as shown in FIG. 8, it was found that the magnetic wall continuously moved into the crystal grain also at an applied magnetic field of −1280 kA/m. Finally, as shown in FIG. 9, the magnetic wall continuously moved into the crystal grain at an applied magnetic field of −1600 kA/m.

According to the observation of the magnetic domain structure in the example 1 described above, it was found that a reverse magnetic domain occurred uniformly in the crystal grain boundary in a low magnetic field, which is, when the absolute value of an applied magnetic field was small. Thus, a magnetic wall pinning force in the grain boundary was uniform, and the squareness of the demagnetization curve was thereby improved. It was also found that the reverse magnetic domain began to propagate in a high magnetic field, which is, when the absolute value of an applied magnetic field was large.

Figure 23:
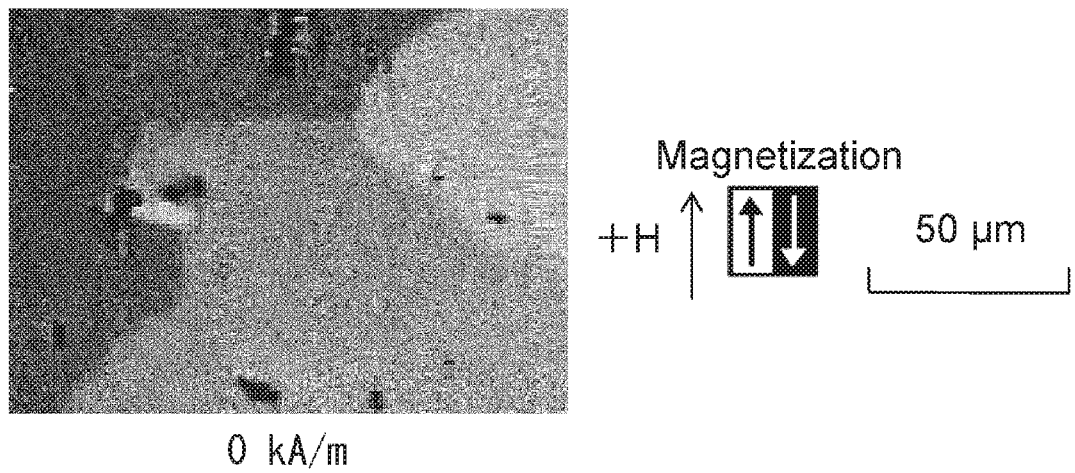
FIG. 23 is an image showing the magnetic domains of a permanent magnet according to a comparative example 1.
Figure 24:
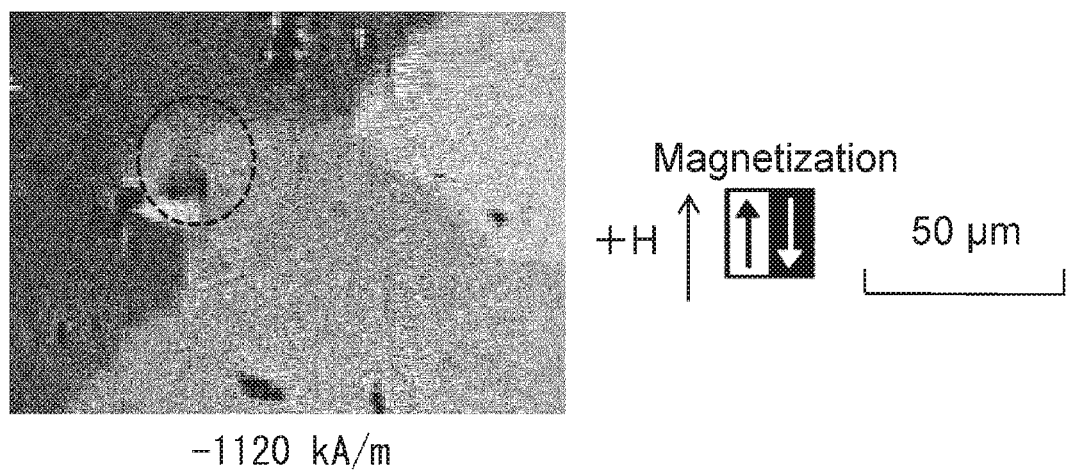
FIG. 24 is an image showing the magnetic domains of the permanent magnet according to the comparative example 1.
Figure 25:
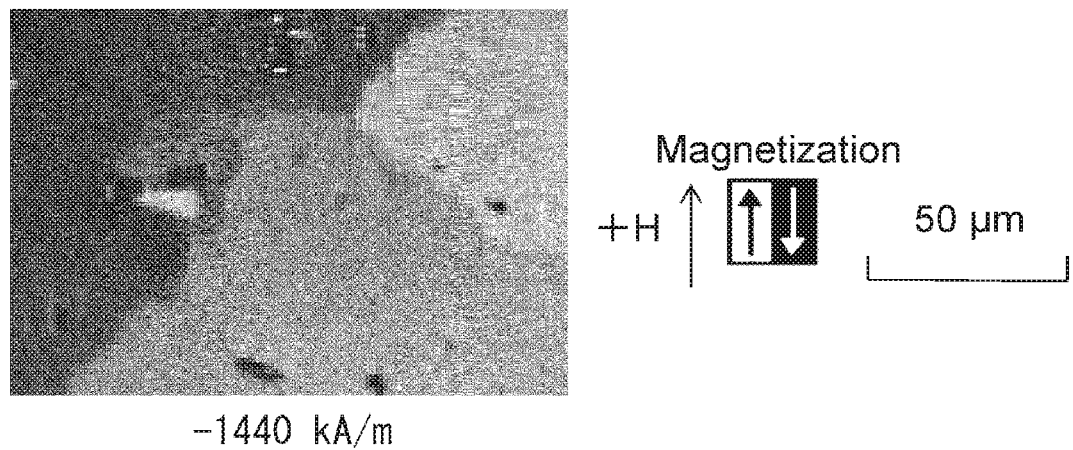
FIG. 25 is an image showing the magnetic domains of the permanent magnet according to the comparative example 1.

On the other hand, in the magnetic domain structure of the comparative example 1, as shown in FIG. 23, a magnetic wall that separates a reverse magnetic domain and its surroundings was not found at an applied magnetic field of −0 kA/m. Next, as shown in FIG. 24, a magnetic wall existed in a part of the crystal grain boundary at an applied magnetic field of −1120 kA/m. Then, as shown in FIG. 25, the magnetic wall moved into the crystal grain from the place where it came into existence at an applied magnetic field of −1440 kA/m. Then, as shown in FIG. 26, the magnetic wall continuously moved into the crystal grain at an applied magnetic field of −1520 kA/m. Then, as shown in FIG. 27, the magnetic wall further continuously moved into the crystal grain at an applied magnetic field of −1600 kA/m.

According to the observation of the magnetic domain structure in the comparative example 1 described above, a reverse magnetic domain was not observed in a low magnetic field. On the other hand, a reverse magnetic domain occurred partly from a part of the crystal grain boundary in a high magnetic field, and this reverse magnetic domain propagated into the crystal grain. Thus, it is considered that because a magnetic wall pinning force in the crystal grain boundary in the comparative example 1 was less uniform than that in the example 1, the squareness of the demagnetization curve was low.

It is known that a magnetic wall comes into existence in a part with low magnetic wall energy and expands. Thus, the fact that a magnetic wall exists uniformly over a wide range in a permanent magnet indicates that the magnetic wall energy is aligned, that is, the squareness of the permanent magnet is high. Therefore, because the magnetic wall exists uniformly over a wide range in the magnetic domain structure in the example 1 compared with the magnetic domain structure in the comparative example 1, the squareness in the example 1 is higher than that in the magnetic domain structure of the comparative example 1.

Elemental Mapping

Figure 11:
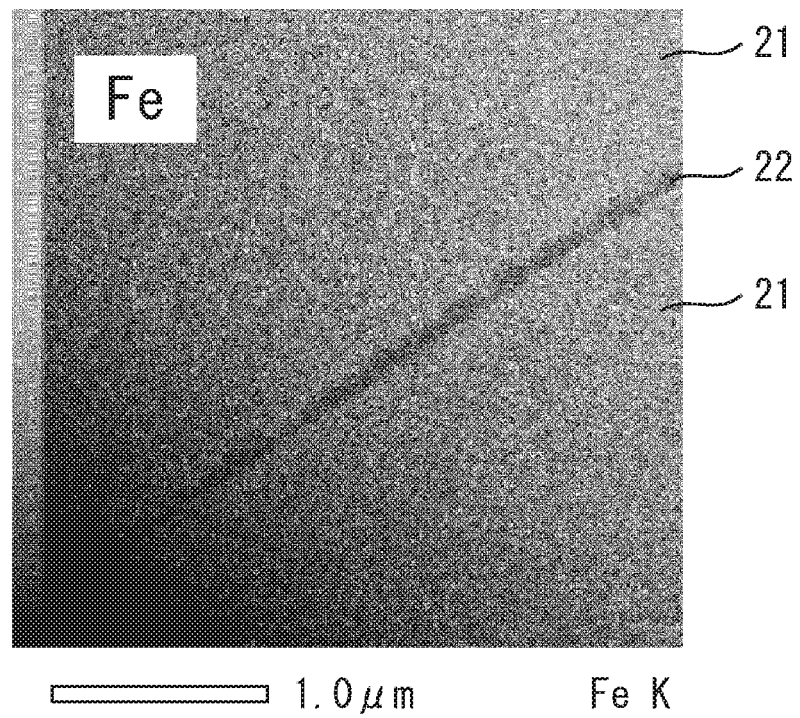
FIG. 11 is an image of the permanent magnet according to the example 1 by elemental mapping.
Figure 12:
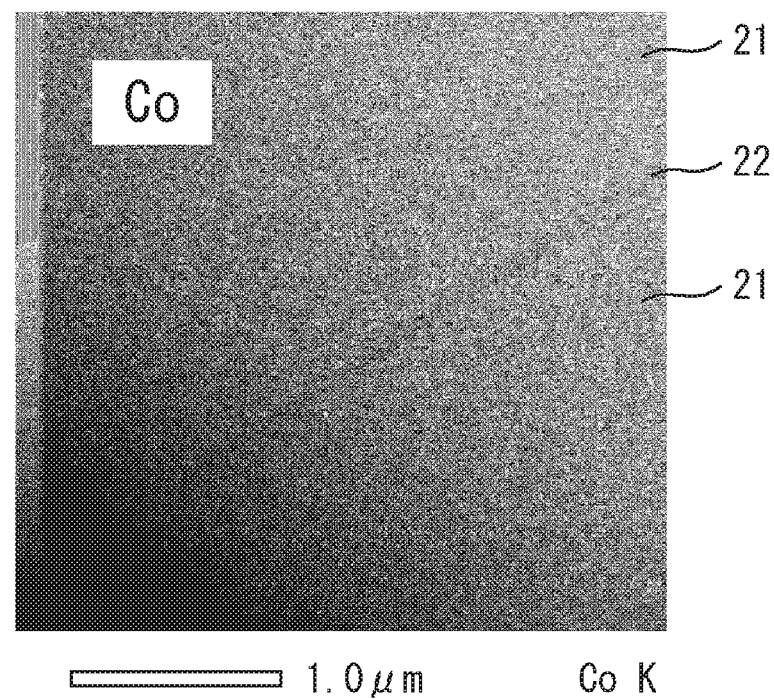
FIG. 12 is an image of the permanent magnet according to the example 1 by elemental mapping.

In the sectional structure of the permanent magnet in the example 1, a plurality of crystal grains 21 and a grain boundary 22 at the boundary between the crystal grains 21 were observed as shown in FIG. 10. As shown in FIG. 11, the content (composition) of Fe in the crystal grain 21 was higher than the content of Fe in the grain boundary 22. Likewise, as shown in FIG. 12, the content of Co in the crystal grain 21 was higher than the content of Co in the grain boundary 22.

Figure 13:
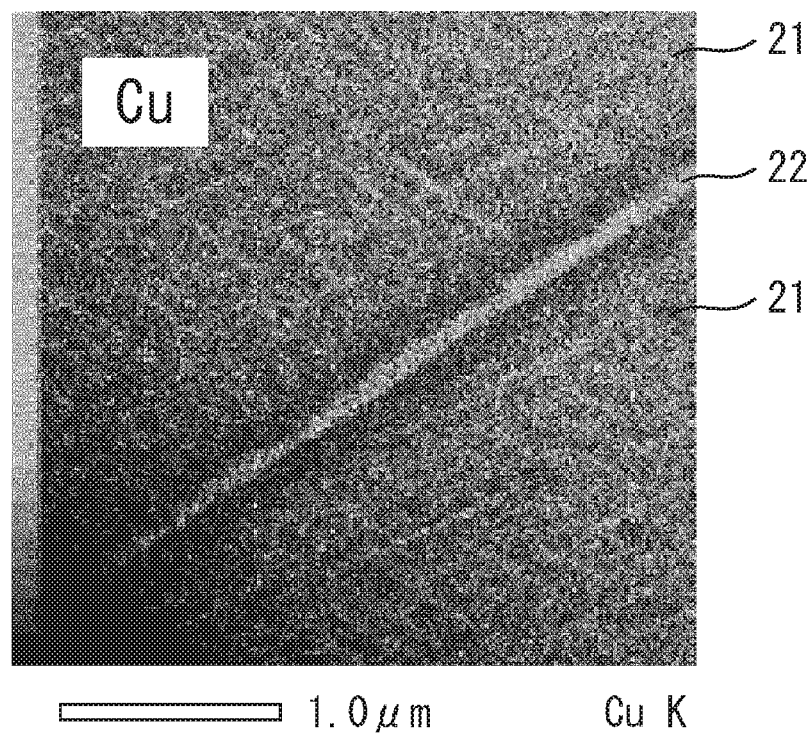
FIG. 13 is an image of the permanent magnet according to the example 1 by elemental mapping.
Figure 14:
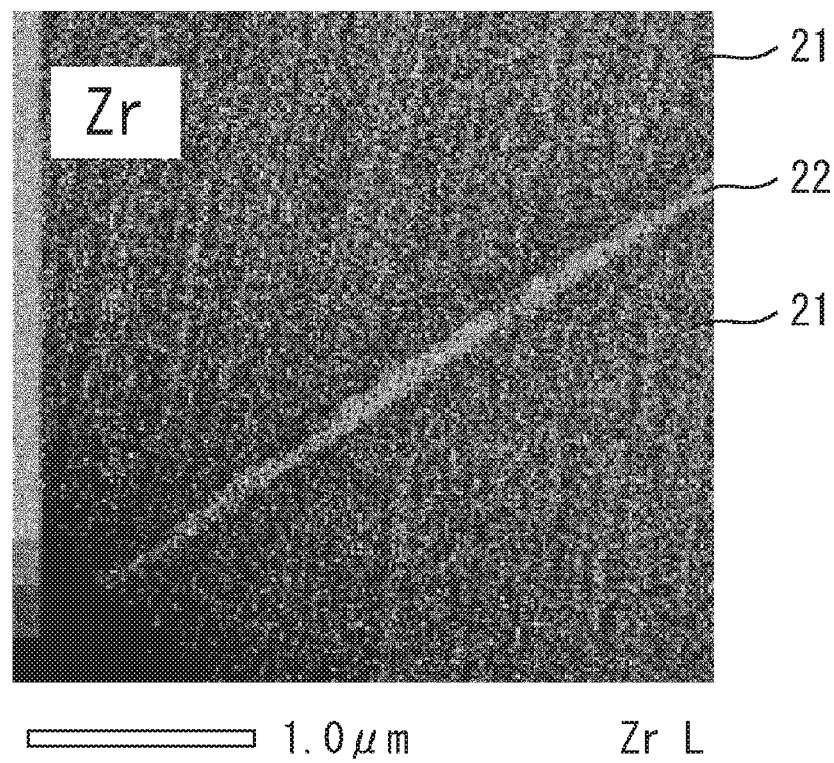
FIG. 14 is an image of the permanent magnet according to the example 1 by elemental mapping.

On the other hand, as shown in FIG. 13, the content of Cu in the grain boundary 22 was higher than the content of Cu in the crystal grain 21. Likewise, as shown in FIG. 14, the content of Zr in the grain boundary 22 was higher than the content of Zr in the crystal grain 21. Thus, the grain boundary 22 had concentrated regions where Cu and Zr were concentrated. The concentrated regions were both continuous, and a discontinuous part was not found. Further, it was found that the grain boundary 22 contained 5 to 30 mass % Cu and 3 to 20 mass % Zr.

Figure 29:
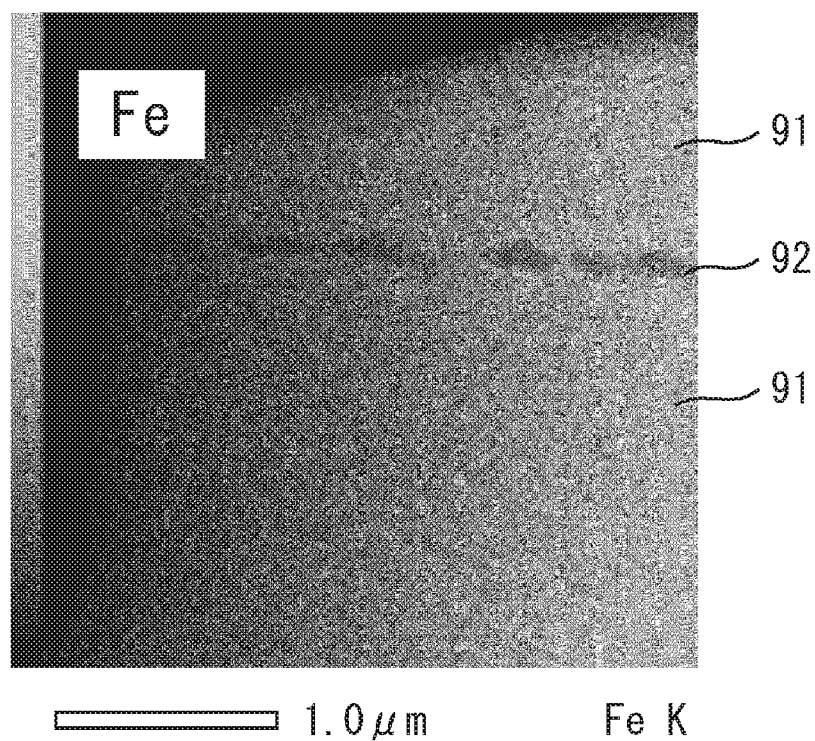
FIG. 29 is an image of the permanent magnet according to the comparative example 1 by elemental mapping.
Figure 30:
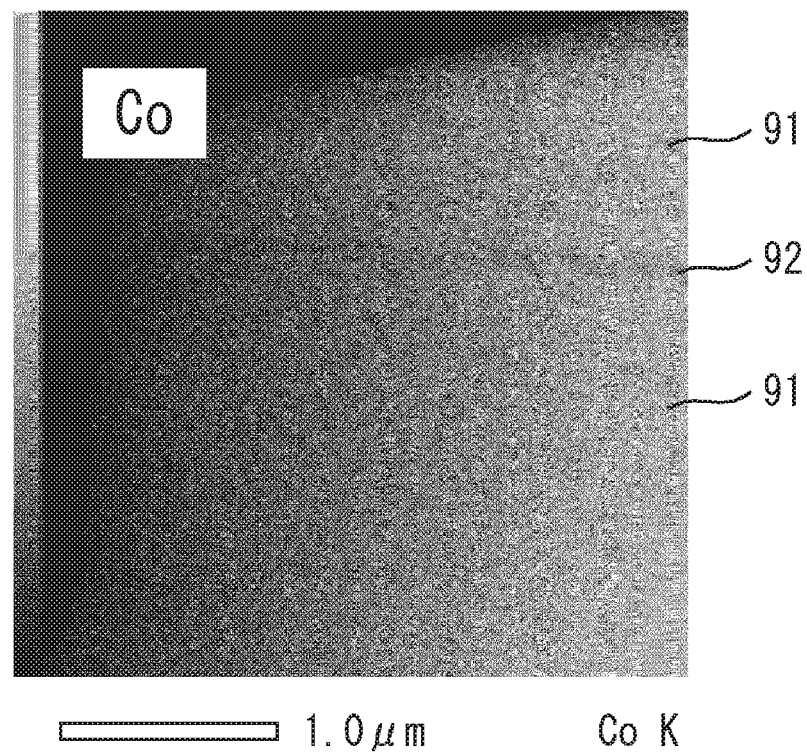
FIG. 30 is an image of the permanent magnet according to the comparative example 1 by elemental mapping.

On the other hand, in the sectional structure of the permanent magnet in the comparative example 1, a plurality of crystal grains 91 and a grain boundary 92 at the boundary between the crystal grains 91 were observed as shown in FIG. 28. As shown in FIG. 29, the content of Fe in the crystal grain 91 was higher than the content of Fe in the grain boundary 92. Likewise, as shown in FIG. 30, the content of Co in the crystal grain 91 was higher than the content of Co in the grain boundary 92.

Figure 31:
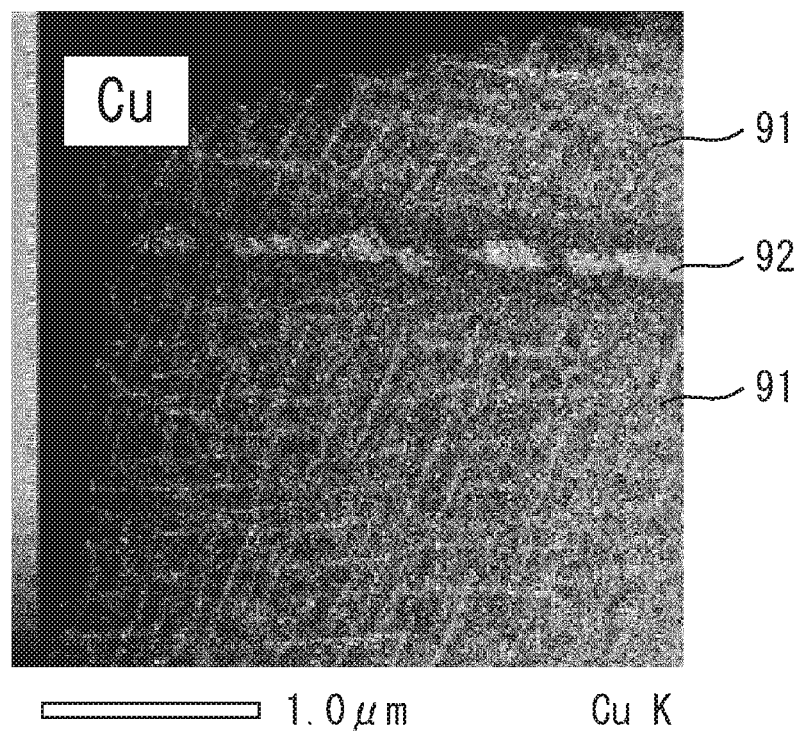
FIG. 31 is an image of the permanent magnet according to the comparative example 1 by elemental mapping.
Figure 32:
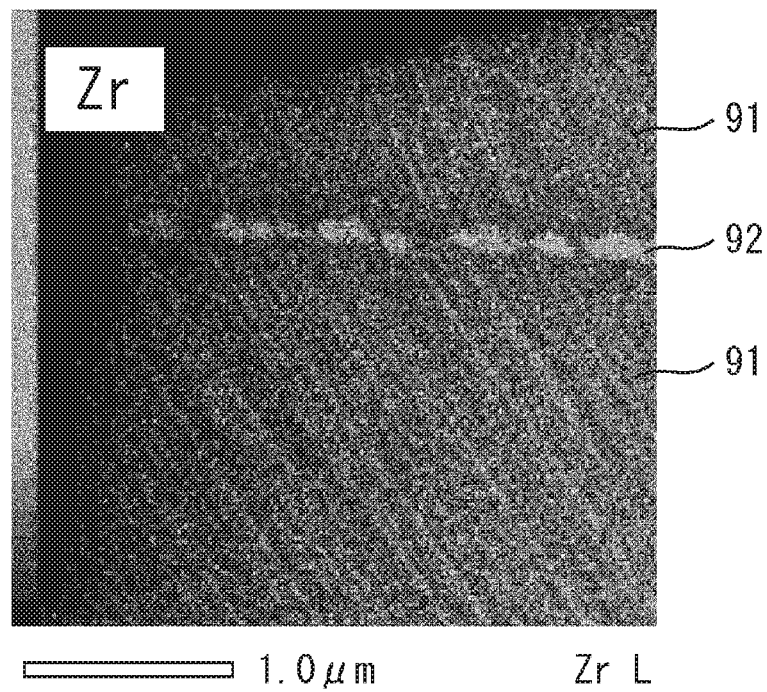
FIG. 32 is an image of the permanent magnet according to the comparative example 1 by elemental mapping.

On the other hand, as shown in FIG. 31, there were a plurality of regions where the content of Cu in the grain boundary 92 was higher than the content of Cu in the crystal grain 91. Likewise, as shown in FIG. 32, there were a plurality of regions where the content of Zr in the grain boundary 92 was higher than the content of Zr in the crystal grain 91. To be specific, the grain boundary 92 had a Cu concentrated region where Cu was concentrated and a Zr concentrated region where Zr was concentrated. The Cu concentrated region and the Zr concentrated region had a discontinuous part and was not continuous.

While the Cu concentrated region and the Zr concentrated region in the grain boundary 22 of the example 1 were both continuous, the Cu concentrated region and the Zr concentrated region in the grain boundary 92 of the comparative example 1 were discontinuous. It is considered that this structure affects a difference in the way the reverse magnetic domain occurs in the crystal grain boundary in the observation of the magnetic domain structure of the example 1 and the comparative example 1.

Experiment 2

Hereinafter, experiments conducted for examples 2 to 9 regarding the permanent magnet according to the first embodiment and comparative examples 2 to 9 are described with reference to Table 3 below.

TABLE 3

|  | Br [T] | HcJ [kA/m] | (BH)max [kJ/[[m$^2$]]m$^3$] | Hk/HcJ [%] | Sm | Fe | Cu | Zr | Co |
|---|---|---|---|---|---|---|---|---|---|
|  |  |  |  |  | [mass %] |  |  |  |  |
| Comparative Example 2 | 1.10 | 720 | 192 | 43 | 23.5 | 20.0 | 4.5 | 2.3 | remainder |
| Example 2 | 1.17 | 1600 | 244 | 50 | 24.0 | 20.0 | 4.5 | 2.3 | remainder |
| Example 3 | 1.13 | 1640 | 240 | 54 | 26.0 | 20.0 | 4.5 | 2.3 | remainder |
| Comparative Example 3 | 1.10 | 760 | 188 | 41 | 26.5 | 20.0 | 4.5 | 2.3 | remainder |
| Comparative Example 4 | 1.13 | 800 | 194 | 35 | 25.0 | 17.5 | 4.5 | 2.3 | remainder |
| Example 4 | 1.14 | 1620 | 242 | 52 | 25.0 | 18.0 | 4.5 | 2.3 | remainder |
| Example 5 | 1.20 | 1660 | 248 | 50 | 25.0 | 22.0 | 4.5 | 2.3 | remainder |

TABLE 3-continued

|  | Br [T] | HcJ [kA/m] | (BH)max [kJ/[[m²]]m³] | Hk/HcJ [%] | Sm | Fe | Cu [mass %] | Zr | Co |
|---|---|---|---|---|---|---|---|---|---|
| Comparative Example 5 | 1.18 | 840 | 190 | 35 | 25.0 | 22.5 | 4.5 | 2.3 | remainder |
| Comparative Example 6 | 1.15 | 880 | 200 | 36 | 25.0 | 20.0 | 4.0 | 2.3 | remainder |
| Example 6 | 1.17 | 1660 | 244 | 51 | 25.0 | 20.0 | 4.2 | 2.3 | remainder |
| Example 7 | 1.14 | 1680 | 250 | 52 | 25.0 | 20.0 | 5.0 | 2.3 | remainder |
| Comparative Example 7 | 1.12 | 920 | 192 | 33 | 25.0 | 20.0 | 5.2 | 2.3 | remainder |
| Comparative Example 8 | 1.15 | 960 | 195 | 43 | 25.0 | 20.0 | 4.4 | 1.8 | remainder |
| Example 8 | 1.19 | 1700 | 248 | 51 | 25.0 | 20.0 | 4.4 | 2.0 | remainder |
| Example 9 | 1.13 | 1720 | 244 | 55 | 25.0 | 20.0 | 4.4 | 2.6 | remainder |
| Comparative Example 9 | 1.11 | 1000 | 197 | 45 | 25.0 | 20.0 | 4.4 | 2.8 | remainder |

In the examples 2 to 9, raw materials were prepared so as to contain the components shown in Table 3 as the target composition, and the rare earth-cobalt permanent magnets were produced by the same production method as in the example 1. Further, the magnetic properties in each of the examples 2 to 9 and the comparative examples 2 to 9 were measured. Furthermore, the magnetic domain structures in the examples 2 to 9 were observed, just like in the example 1 and the comparative example 1.

As shown in Table 3, in the examples 2 and 3, the coercive force Hcj was 1600 kA/m or more, the energy product (BH)max was 200 kJ/m³ or more, and the squareness Hk/Hcj was 50% or more, which are suitable. Note that the suitable values were a coercive force Hcj of 1600 kA/m or more, an energy product (BH)max of 200 kJ/m³ or more, and a squareness Hk/Hcj of 50% or more. On the other hand, in the comparative example 2, compared with the examples 2 and 3, the content of Sm was as low as 23.5 mass %, and the coercive force Hcj, the energy product (BH)max, and the squareness Hk/Hcj were lower. In the comparative example 3, compared with the examples 2 and 3, the content of Sm was as high as 26.5 mass %, and the coercive force Hcj, the energy product (BH)max, and the squareness Hk/Hcj were lower. Thus, the values of the coercive force Hcj, the energy product (BH)max, and the squareness Hk/Hcj are expected to be suitable when the content of Sm in the target composition is 24 to 26 mass %.

In the examples 4 and 5, the coercive force Hcj, the energy product (BH)max, and the squareness Hk/Hcj were suitable values, just like in the examples 2 and 3. On the other hand, in the comparative example 4, compared with the examples 4 and 5, the content of Fe was as low as 17.5 mass %, and the coercive force Hcj, the energy product (BH)max, and the squareness Hk/Hcj were lower. In the comparative example 5, compared with the examples 4 and 5, the content of Fe was as high as 22.5 mass %, and the coercive force Hcj, the energy product (BH)max, and the squareness Hk/Hcj were lower. Thus, the values of the coercive force Hcj, the energy product (BH)max, and the squareness Hk/Hcj are expected to be suitable when the content of Fe in the target composition is 18 to 22 mass %.

In the examples 6 and 7, the coercive force Hcj, the energy product (BH)max, and the squareness Hk/Hcj were suitable values, just like in the examples 2 and 3. On the other hand, in the comparative example 6, compared with the examples 6 and 7, the content of Cu was as low as 4.0 mass %, and the coercive force Hcj, the energy product (BH)max, and the squareness Hk/Hcj were lower. In the comparative example 7, compared with the examples 6 and 7, the content of Cu was as high as 5.2 mass %, and the coercive force Hcj, the energy product (BH)max, and the squareness Hk/Hcj were lower. Thus, the values of the coercive force Hcj, the energy product (BH)max, and the squareness Hk/Hcj are expected to be suitable when the content of Cu in the target composition is 4.2 to 5.0 mass %.

In the examples 8 and 9, the coercive force Hcj, the energy product (BH)max, and the squareness Hk/Hcj were suitable values, just like in the examples 2 and 3. On the other hand, in the comparative example 8, compared with the examples 8 and 9, the content of Zr was as low as 1.8 mass %, and the coercive force Hcj, the energy product (BH)max, and the squareness Hk/Hcj were lower. In the comparative example 9, compared with the examples 8 and 9, the content of Zr was as high as 2.8 mass %, and the coercive force Hcj, the energy product (BH)max, and the squareness Hk/Hcj were lower. Thus, the values of the coercive force Hcj, the energy product (BH)max, and the squareness Hk/Hcj are expected to be suitable when the content of Zr in the target composition is 2.0 to 2.6 mass %.

The magnetic domain structures in the examples 2 to 9 were observed, just like in the example 1 and the comparative example 1. As a result, it was found that, in the examples 2 to 9, the magnetic wall came into existence uniformly along the crystal grain boundary and, upon exceeding the critical magnetic field, it grew toward the inside of the crystal grain, just like in the example 1.

Experiment 3

Hereinafter, experiments conducted for examples 10 to 13 regarding the permanent magnet according to the first embodiment and comparative examples 10 and 11 are described with reference to Table 4 below.

TABLE 4

|  | Br [T] | HcJ [kA/m] | (BH)max [kJ/[[m²]]m³] | Hk/HcJ [%] | C [ppm] | O [ppm] |
|---|---|---|---|---|---|---|
| Example 10 | 1.15 | 1760 | 248 | 60 | 200 | 3000 |
| Example 11 | 1.12 | 1600 | 240 | 50 | 1000 | 3000 |
| Comparative Example 10 | 1.08 | 1440 | 195 | 35 | 1100 | 3000 |
| Example 12 | 1.17 | 1760 | 252 | 62 | 500 | 1000 |
| Example 13 | 1.13 | 1680 | 244 | 51 | 500 | 5000 |
| Comparative Example 11 | 1.10 | 1400 | 196 | 40 | 500 | 5250 |

In the examples 10 to 13, the rare earth-cobalt permanent magnets, where the target composition was an alloy consisting of 24.5 to 25.5 mass % Sm, 4.5 mass % Cu, 20.0 mass % Fe, 2.3 mass % Zr, and the remainder Co, were produced by the same production method as in the example 1, except that the content of C (carbon) and O (oxygen) were varied as shown in Table 4. The content of C (Carbon) was adjusted by changing the amount of a lubricant such as stearic acid or an addition method in the press molding step S4. The content of O (Oxygen) was adjusted by changing the particle diameter or the like at the time of fine grinding in the powdering step S3. Further, the magnetic properties in the examples 10 to 13 and the comparative examples 10 and 11 were measured, just like in the example 1 and the comparative example 1. Furthermore, the magnetic domain structures in the examples 10 to 13 were observed, just like in the example 1 and the comparative example 1.

As shown in Table 4, in the examples 10 and 11, the coercive force Hcj, the energy product (BH)max, and the squareness Hk/Hcj were suitable values. On the other hand, in the comparative example 10, compared with the examples 10 and 11, the content of C was as high as 1100 ppm, and the coercive force Hcj, the energy product (BH)max, and the squareness Hk/Hcj were lower. Thus, good magnetic properties are expected to be obtained when the content of C is restricted to 200 to 1000 ppm.

In the examples 12 and 13, the coercive force Hcj, the energy product (BH)max, and the squareness Hk/Hcj were suitable values. On the other hand, in the comparative example 11, compared with the examples 12 and 13, the content of O was as high as 5250 ppm, and the coercive force Hcj, the energy product (BH)max, and the squareness Hk/Hcj were lower. Thus, good magnetic properties are expected to be obtained when the content of O is restricted to 1000 to 5000 ppm, or more preferably to 1000 to 3500 ppm.

The magnetic domain structures in the examples 10 to 13 were observed, just like in the example 1 and the comparative example 1. As a result, it was found that, in the examples 10 to 13, the magnetic wall came into existence uniformly along the crystal grain boundary and, upon exceeding the critical magnetic field, it grew toward the inside of the crystal grain, just like in the example 1.

Experiment 4

Hereinafter, experiments conducted for examples 21 to 23 regarding the permanent magnet according to the second embodiment and reference examples 1 and 2 are described with reference to Tables 5 and 6 below.

In the examples 21 to 23, rare earth-cobalt permanent magnets were produced by the same method as the method of producing the rare earth-cobalt permanent magnet according to the second embodiment (see FIG. 16). The target composition in the material combining step S21 in the example 21 to 23 is shown in Table 5. As shown in Table 5, the target composition in the examples 21 to 23 contains 25.0 mass % R(Sm), 21.0 mass % Fe, 4.35 mass % Cu, 2.00 mass % Zr, and the remainder Co. The amount of Cu on cell interface is the content of Cu in a part corresponding to the grain boundary 202, and the amount of Zr on cell interface is the content of Zr in a part corresponding to the grain boundary 202.

TABLE 5

| | Composition | Sintering temperature [° C.] | Density [g/cm$^3$] | (BH) max [kJ/m$^3$] | Hcj [kA/m] | Amount of Cu on cell interface [mass %] | Amount of Zr on cell interface [mass %] |
|---|---|---|---|---|---|---|---|
| Example 21 | $Sm_{25.0}Fe_{21.0}Cu_{4.35}Zr_{2.00}Co_{bal}$ | 1175 | 8.25 | 255 | 2050 | 28 | 12 |
| Example 22 | $Sm_{25.0}Fe_{21.0}Cu_{4.35}Zr_{2.00}Co_{bal}$ | 1200 | 8.30 | 263 | 1873 | 45 | 13 |
| Example 23 | $Sm_{25.0}Fe_{21.0}Cu_{4.35}Zr_{2.00}Co_{bal}$ | 1225 | 8.35 | 260 | 1625 | 37 | 15 |
| Reference Example 1 | $Sm_{25.0}Fe_{21.0}Cu_{4.35}Zr_{2.00}Co_{bal}$ | 1150 | 8.20 | 252 | 2020 | 4 | 2 |
| Reference Example 2 | $Sm_{25.0}Fe_{21.0}Cu_{4.35}Zr_{2.00}Co_{bal}$ | 1250 | 8.40 | 255 | 1486 | 34 | 10 |

| | Occurrence of Reverse Magnetic Domain |
|---|---|
| Example 21 | occurred only in one side of cross section of crystal grain boundary |
| Example 22 | occurred only in one side of cross section of crystal grain boundary |
| Example 23 | occurred only in one side of cross section of crystal grain boundary |
| Reference Example 1 | occurred in crystal grain boundary and inside crystal grain |
| Reference Example 2 | occurred in crystal grain boundary and inside crystal grain |

In the material combining step S21, 20% Fe-80% Zr alloy was used as the master alloy containing Zr. Further, in the powdering step S23, the average particle diameter (d50) of the coarse powder was 100 to 500 μm. Further, an ingot was finely ground into powder with an average particle diameter (d50) of 6 μm in an inert gas atmosphere by using a ball mill. In the press molding step S24, press molding was performed under the conditions with a magnetic field of 15 kOe and a press-molding pressure of 1.0 ton/cm$^2$ (=98 MPa) and thereby a plurality of molded bodies were obtained. In the sintering step S25, sintering was performed for 1.0 hour at the sintering temperature shown in Table 5 under a vacuum atmosphere of 10 Pa. In the solution treatment step S26, the temperature of the molded body was dropped to a solution temperature of 1150° C., and solution treatment was performed under the conditions with a solution temperature of 1150° C. and a solution treatment time of 10 hours. In the rapid cooling step S27, rapid cooling was performed at a cooling rate of 80° C./min in the range where the temperature of the molded body was 1000° C. to 600° C. In the first aging treatment step S28, the molded body was heated to a temperature of 850° C. in an inert gas atmosphere, isothermal aging treatment was performed by heating and holding them for 10 hours at a temperature of 850° C. and, after that, continuous aging treatment was performed to 350° C. at a cooling rate of 0.5° C./min, thereby obtaining a permanent magnet.

In the reference examples 1 and 2, just like in the examples 21 to 23, rare earth-cobalt permanent magnets were produced by the same method as the method of producing the rare earth-cobalt permanent magnet according to the second embodiment described above (see FIG. 16) and under the same conditions as in the examples 21 to 23, except for the sintering step S25. In a step corresponding to the sintering step S25 in the production method according to the reference examples 1 and 2, sintering was performed at the sintering temperature shown in Table 5.

The density and the magnetic properties in the examples 21 to 23 and the reference examples 1 and 2 were measured. The measured magnetic properties were a coercive force (intrinsic coercive force) Hcj [kA/m] and a maximum energy product (BH)max[kJ/m³]. Measured results are shown in Table 5. Further, the magnetic domain structure of the sectional structure in the example 21 was observed by use of an optical microscope using the magnetic Kerr effect. Images by this observation are shown in FIGS. 17 to 22.

As shown in Table 5, the permanent magnets in the examples 21 to 23 had a density of 8.25 g/cm³ or more, a maximum energy product (BH)max of 255 kJ/m³ or more, and a coercive force Hcj of 1600 kA/m or more. When a magnetic field was applied to the permanent magnets in the examples 21 to 23, a reverse magnetic domain occurred only from one side of the cross section of the crystal grain boundary, and it propagated into the grain. One reason would be because the sintering temperature was within the range of 1175° C. to 1225° C. To be specific, good magnetic properties are expected to be obtained when the sintering temperature is 1175° C. or higher because sintering progresses sufficiently, and when the sintering temperature is 1225° C. or lower because Sm is less likely to evaporate.

On the other hand, the permanent magnets in the reference examples 1 and 2 did not satisfy all of a density of 8.25 g/cm³ or more, a maximum energy product (BH)max of 255 kJ/m³ or more, and a coercive force Hcj of 1600 kA/m or more. Further, when a magnetic field was applied to the permanent magnets in the reference examples 1 and 2, a reverse magnetic domain occurred not only from one side of the cross section of the crystal grain boundary but also occurred inside the grain, and they propagated into the crystal grain and another part in the grain. One reason would be because the sintering temperature was lower than 1175° C. or higher than 1225° C.

Observation of Magnetic Domain Structure

Figure 17:
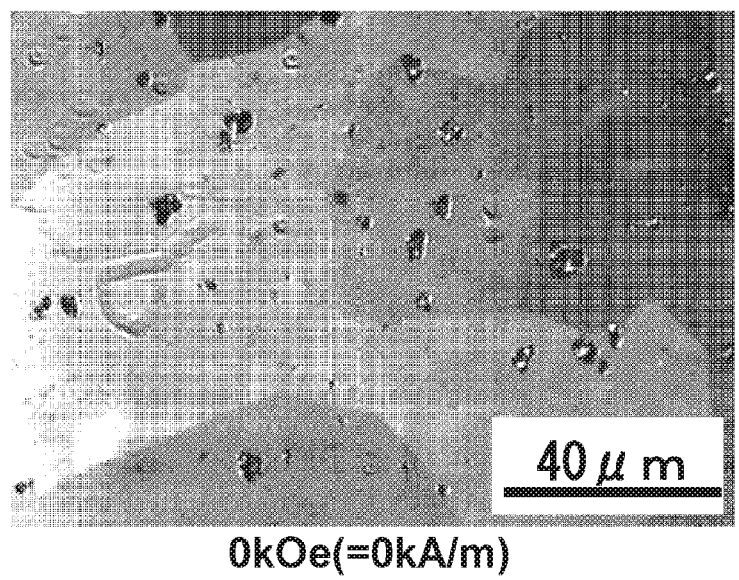
FIG. 17 is an image showing the magnetic domains of a permanent magnet according to an example 21.

The magnetic domain structure of the example 21 was observed by gradually increasing the absolute value of an applied magnetic field in the demagnetizing field. First, as shown in FIG. 17, a magnetic wall that separates a reverse magnetic domain and its surroundings was not found at an applied magnetic field of −0 kOe (=−0 kA/m).

Figure 18:
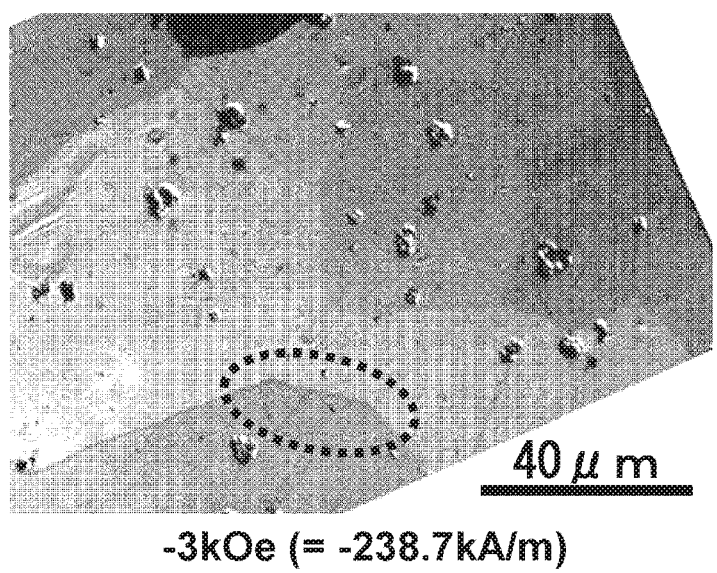
FIG. 18 is an image showing the magnetic domains of the permanent magnet according to the example 21.

As shown in FIG. 18, it was found that, at an applied magnetic field of −3 kOe (=−238.7 kA/m), a magnetic wall existed in the crystal grain boundary and a reverse magnetic domain had a uniform width along the grain boundary.

Figure 19:
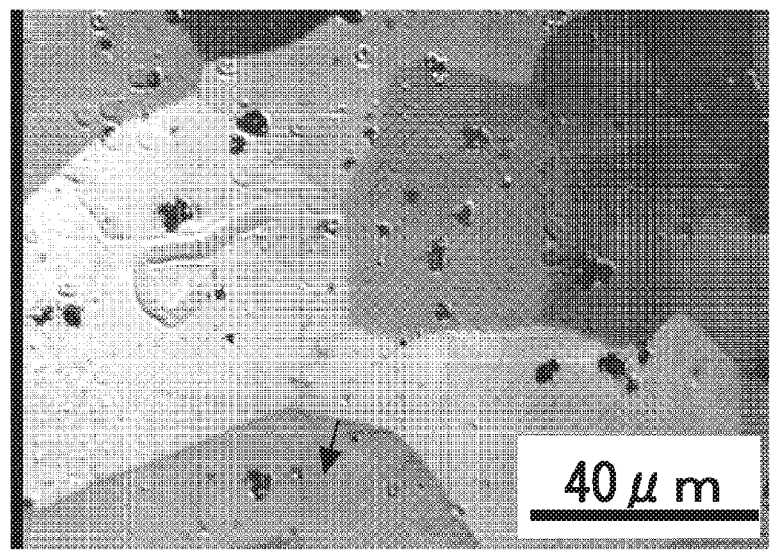
FIG. 19 is an image showing the magnetic domains of the permanent magnet according to the example 21.

As shown in FIG. 19, it was found that, at an applied magnetic field of −10 kOe (=−795.8 kA/m), the magnetic wall moved into the crystal grain (in the direction of the arrow in this example). In other words, a reverse magnetic domain began to propagate into the crystal grain. Thus, a critical magnetic field that determines whether or not the magnetic wall moves from the crystal grain boundary to the inside of the crystal grain is considered to be in the range of −3 to −10 kOe (=−238.7 to −795.8 kA/m).

Figure 20:
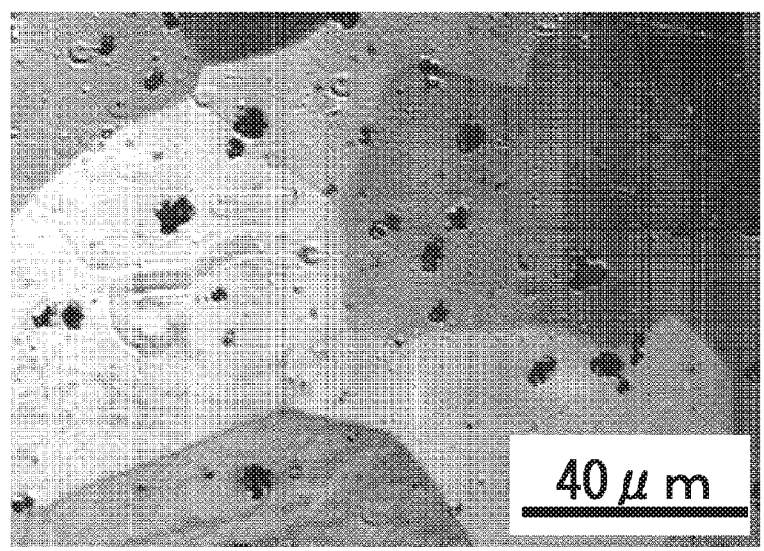
FIG. 20 is an image showing the magnetic domains of the permanent magnet according to the example 21.

As shown in FIG. 20, it was found that, at an applied magnetic field of −12 kOe (=−954.9 kA/m), the magnetic wall continuously moved into the crystal grain, and propagation into the crystal grain by the reverse magnetic domain became wider.

Figure 21:
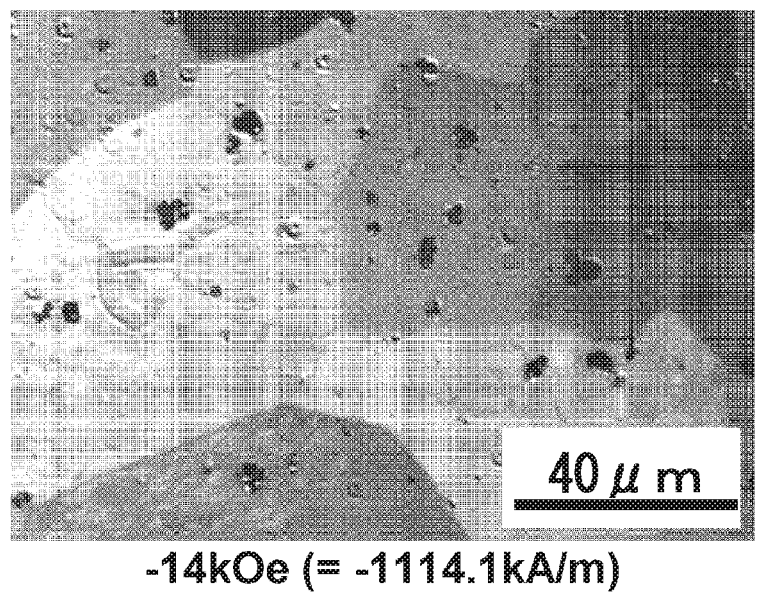
FIG. 21 is an image showing the magnetic domains of the permanent magnet according to the example 21.

As shown in FIG. 21, it was found that, at an applied magnetic field of −14 kOe (=−1114.1 kA/m) also, the magnetic wall continuously moved into the crystal grain, and propagation into the crystal grain by the reverse magnetic domain became still wider.

Figure 22:
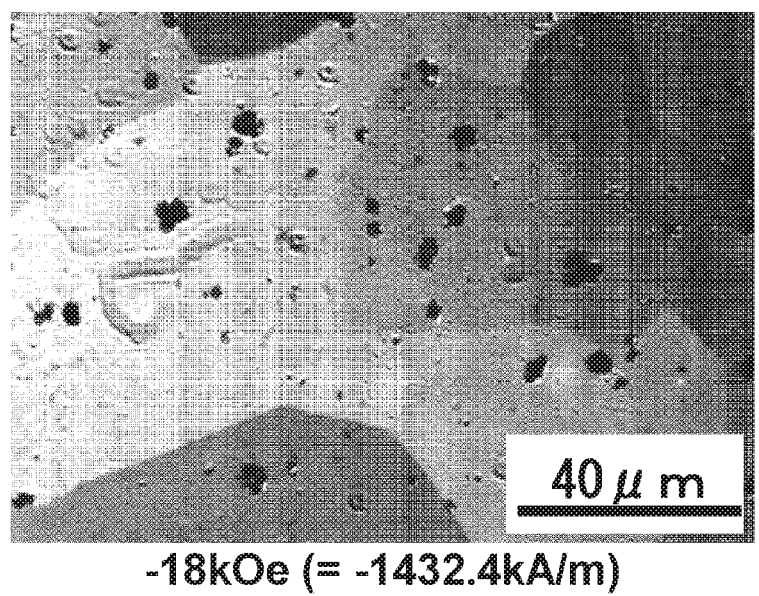
FIG. 22 is an image showing the magnetic domains of the permanent magnet according to the example 21.

Finally as shown in FIG. 22, at an applied magnetic field of −18 kOe (=−1432.4 kA/m), propagation into the crystal grain by the reverse magnetic domain became still wider, and magnetization reversal ended.

According to the observation of the magnetic domain structure in the example 21 described above, it was found that a reverse magnetic domain occurred uniformly in the crystal grain boundary in a low magnetic field, which is, when the absolute value of an applied magnetic field was small. Thus, a magnetic wall pinning force in the grain boundary was uniform, and the squareness of the demagnetization curve was thereby improved. It was also found that the reverse magnetic domain began to propagate in a high magnetic field, which is, when the absolute value of an applied magnetic field was large.

Note that, in both of the examples 22 and 23, it was found that a reverse magnetic domain occurred uniformly in the crystal grain boundary when the absolute value of the applied magnetic field was small, and therefore a magnetic wall pinning force in the grain boundary was uniform, and the squareness of the demagnetization curve was thereby improved.

Experiment 5

Hereinafter, experiments conducted for examples 24 to 26 regarding the permanent magnet according to the second embodiment and comparative examples 23 and 24 are described with reference to Tables 7 and 8 below.

In the examples 24 to 26, rare earth-cobalt permanent magnets were produced by the same method as the method of producing the rare earth-cobalt permanent magnet according to the second embodiment described above (see FIG. 16) and under the same conditions as in the example 22, except for the material combining step S21, the sintering step S25 and the solution treatment step S26.

The target composition in the material combining step S21 in the examples 24 to 26 is shown in Table 7. As shown in Table 7, the target composition in the examples 24 to 26 contains 25.5 mass % R(Sm), 25.0 mass % Fe, 5.0 mass % Cu, 2.15 mass % Zr, and the remainder Co.

TABLE 7

|  | Composition | Sintering time [min] | Density [g/cm³] | (BH)max [kJ/m³] | Hcj [kA/m] | Amount of Cu on cell interface [mass %] | Amount of Zr on cell interface [mass %] |
|---|---|---|---|---|---|---|---|
| Example 24 | $Sm_{25.5}Fe_{25.0}Cu_{5.0}Zr_{2.15}Co_{bal}$ | 20 | 8.31 | 267 | 1964 | 38 | 7 |
| Example 25 | $Sm_{25.5}Fe_{25.0}Cu_{5.0}Zr_{2.15}Co_{bal}$ | 90 | 8.33 | 266 | 1881 | 42 | 16 |

TABLE 7-continued

| | Composition | Sintering time [min] | Density [g/cm³] | (BH)max [kJ/m³] | Hcj [kA/m] | Amount of Cu on cell interface [mass %] | Amount of Zr on cell interface [mass %] |
|---|---|---|---|---|---|---|---|
| Example 26 | $Sm_{25.5}Fe_{25.0}Cu_{5.0}Zr_{2.15}Co_{bal}$ | 180 | 8.34 | 262 | 1757 | 30 | 10 |
| Comparative Example 23 | $Sm_{25.5}Fe_{25.0}Cu_{5.0}Zr_{2.15}Co_{bal}$ | 10 | 8.24 | 253 | 1686 | 25 | 2 |
| Comparative Example 24 | $Sm_{25.5}Fe_{25.0}Cu_{5.0}Zr_{2.15}Co_{bal}$ | 300 | 8.38 | 266 | 1389 | 20 | 22 |

TABLE 8

| | Occurrence of Reverse Magnetic Domain |
|---|---|
| Example 24 | occurred only in one side of cross section of crystal grain boundary |
| Example 25 | occurred only in one side of cross section of crystal grain boundary |
| Example 26 | occurred only in one side of cross section of crystal grain boundary |
| Comparative Example 23 | occurred in crystal grain boundary and inside crystal grain |
| Comparative Example 24 | occurred in crystal grain boundary and inside crystal grain |

In the sintering step S25, sintering was performed in the conditions with a sintering temperature of 1200° C. and the sintering time shown in Table 7 under a vacuum atmosphere of 10 Pa. In the solution treatment step S26, the temperature of the molded body was dropped to a solution temperature of 1155° C., and solution treatment was performed in the conditions with a solution temperature of 1155° C. and a solution treatment time of 10 hours.

In the comparative examples 23 and 24, just like in the examples 24 to 26, rare earth-cobalt permanent magnets were produced by the same method as the method of producing the rare earth-cobalt permanent magnet according to the second embodiment described above (see FIG. 16) and under the same conditions as in the examples 24 to 26, except for the sintering step S25 and the solution treatment step S26. In the production method according to the comparative examples 23 and 24, in a step corresponding to the sintering step S25, sintering was performing for the sintering time shown in Table 7. In a step corresponding to the solution treatment step S26, the temperature of the molded bodies was dropped to a solution temperature of 1170° C., and solution treatment was performed in the conditions with a solution temperature of 1170° C. and a solution treatment time of 5 hours.

The density and the magnetic properties in the examples 24 to 26 and the comparative examples 23 and 24 were measured, just like in the examples 21 to 23. Measured results are shown in Table 7. Further, the magnetic domain structures of the sectional structures in the examples 24 to 26 and the comparative examples 23 and 24 were observed by use of an optical microscope using the magnetic Kerr effect. Observed results are shown in Table 8.

As shown in Table 7, the permanent magnets in the examples 24 to 26 had a density of 8.25 g/cm³ or more, a maximum energy product (BH)max of 255 kJ/m³ or more, and a coercive force Hcj of 1600 kA/m or more. When a magnetic field was applied to the permanent magnets in the examples 24 to 26, a reverse magnetic domain occurred only from one side of the cross section of the crystal grain boundary, and it propagated into the grain. One reason would be because the sintering time was within the range of 20 to 180 minutes (min). To be specific, good magnetic properties are expected to be obtained when the sintering time is 20 minutes or longer because sintering progresses sufficiently, and when the sintering time is 180 minutes or shorter because Sm is less likely to evaporate.

On the other hand, the permanent magnets in the comparative examples 23 and 24 did not satisfy all of a density of 8.25 g/cm³ or more, a maximum energy product (BH)max of 255 kJ/m³ or more, and a coercive force Hcj of 1600 kA/m or more. Further, when a magnetic field was applied to the permanent magnets in the comparative examples 23 and 24, a reverse magnetic domain occurred not only from one side of the cross section of the crystal grain boundary but also occurred inside the grain, and they propagated into the crystal grain and another part in the grain. One reason would be because the sintering time was shorter than 20 minutes or longer than 180 minutes.

Experiment 6

Hereinafter, experiments conducted for examples 27 to 29 regarding the permanent magnet according to the second embodiment and comparative examples 25 and 26 are described with reference to Tables 9 and 10 below.

In the examples 27 to 29, rare earth-cobalt permanent magnets were produced by the same method as the method of producing the rare earth-cobalt permanent magnet according to the second embodiment described above (see FIG. 16) and under the same conditions as in the example 22, except for the material combining step S21, the sintering step S25 and the solution treatment step S26.

The target composition in the material combining step S21 in the example 27 to 29 is shown in Table 9. As shown in Table 9, the target composition in the examples 27 to 29 contains 24.5 mass % R(Sm), 20.0 mass % Fe, 4.65 mass % Cu, 3.00 mass % Zr, and the remainder CO.

TABLE 9

| | Composition | Solution temperature [° C.] | Density [g/cm³] | (BH)max [kJ/m³] | Hcj [kA/m] | Amount of Cu on cell interface [mass %] | Amount of Zr on cell interface [mass %] |
|---|---|---|---|---|---|---|---|
| Example 27 | $Sm_{24.5}Fe_{20.0}Cu_{4.65}Zr_{3.00}Co_{bal}$ | 1130 | 8.28 | 256 | 1954 | 22 | 8 |
| Example 28 | $Sm_{24.5}Fe_{20.0}Cu_{4.65}Zr_{3.00}Co_{bal}$ | 1155 | 8.31 | 261 | 1860 | 43 | 13 |
| Example 29 | $Sm_{24.5}Fe_{20.0}Cu_{4.65}Zr_{3.00}Co_{bal}$ | 1180 | 8.33 | 258 | 1959 | 33 | 18 |

TABLE 9-continued

| | Composition | Solution temperature [° C.] | Density [g/cm$^3$] | (BH)max [kJ/m$^3$] | Hcj [kA/m] | Amount of Cu on cell interface [mass %] | Amount of Zr on cell interface [mass %] |
|---|---|---|---|---|---|---|---|
| Comparative Example 25 | Sm$_{24.5}$Fe$_{20.0}$Cu$_{4.65}$Zr$_{3.00}$Co$_{bal}$ | 1120 | 8.23 | 248 | 2014 | 3 | 1 |
| Comparative Example 26 | Sm$_{24.5}$Fe$_{20.0}$Cu$_{4.65}$Zr$_{3.00}$Co$_{bal}$ | 1190 | 8.33 | 250 | 1362 | 27 | 24 |

TABLE 10

| | Occurrence of Reverse Magnetic Domain |
|---|---|
| Example 27 | occurred only in one side of cross section of crystal grain boundary |
| Example 28 | occurred only in one side of cross section of crystal grain boundary |
| Example 29 | occurred only in one side of cross section of crystal grain boundary |
| Comparative Example 25 | occurred in crystal grain boundary and inside crystal grain |
| Comparative Example 26 | occurred in crystal grain boundary and inside crystal grain |

In the sintering step S25, sintering was performed in the conditions with a sintering temperature of 1210° C. and a sintering time of 1.0 hour under a vacuum atmosphere of 10 Pa. In the solution treatment step S26, the temperature of the molded body was dropped to the solution temperature shown in Table 9, and solution treatment was performed in the conditions with this solution temperature and a solution treatment time of 5 hours.

In the comparative examples 25 and 26, just like in the examples 27 to 29, rare earth-cobalt permanent magnets were produced by the same method as the method of producing the rare earth-cobalt permanent magnet according to the second embodiment described above (see FIG. 16) and under the same conditions as in the examples 27 to 29, except for the solution treatment step S26.

In a step corresponding to the solution treatment step S26, the temperature of the molded body was dropped to the solution temperature shown in Table 9, and solution treatment was performed in the conditions with this solution temperature and a solution treatment time of 5 hours.

The density and the magnetic properties in the examples 27 to 29 and the comparative examples 25 and 26 were measured, just like in the examples 21 to 23. Measured results are shown in Table 9. Further, the magnetic domain structures of the sectional structures in the examples 27 to 29 and the comparative examples 25 and 26 were observed by use of an optical microscope using the magnetic Kerr effect. Observed results are shown in Table 10.

As shown in Table 9, the permanent magnets in the examples 27 to 29 had a density of 8.25 g/cm$^3$ or more, a maximum energy product (BH)max of 255 kJ/m$^3$ or more, and a coercive force Hcj of 1600 kA/m or more. When a magnetic field was applied to the permanent magnets in the examples 27 to 29, a reverse magnetic domain occurred only from one side of the cross section of the crystal grain boundary, and it propagated into the grain. One reason would be because the solution temperature was within the range of 1130° C. to 1180° C. To be specific, good magnetic properties are expected to be obtained when the solution temperature is 1130° C. or higher because homogenization progresses, and when the solution temperature is 1180° C. or lower because a liquid phase component is less likely to remain regardless of composition.

On the other hand, the permanent magnets in the comparative examples 25 and 26 did not satisfy all of a density of 8.25 g/cm$^3$ or more, a maximum energy product (BH)max of 255 kJ/m$^3$ or more, and a coercive force Hcj of 1600 kA/m or more. Further, when a magnetic field was applied to the permanent magnets in the comparative examples 25 and 26, a reverse magnetic domain occurred not only from one side of the cross section of the crystal grain boundary but also occurred inside the grain, and they propagated into the crystal grain and another part in the grain. One reason would be because the solution temperature was lower than 1130° C. or higher than 1180° C.

Experiment 7

Hereinafter, experiments conducted for examples 30 to 32 regarding the permanent magnet according to the second embodiment and comparative examples 27 and 28 are described with reference to Tables 11 and 12 below.

In the examples 30 to 32, rare earth-cobalt permanent magnets were produced by the same method as the method of producing the rare earth-cobalt permanent magnet according to the second embodiment described above (see FIG. 16) and under the same conditions as in the example 22, except for the material combining step S21 and the solution treatment step S26.

The target composition in the material combining step S21 in the example 30 to 32 is shown in Table 11. As shown in Table 11, the target composition in the examples 30 to 32 contains 26.0 mass % R(Sm), 22.5 mass % Fe, 3.85 mass % Cu, 2.50 mass % Zr, and the remainder Co.

TABLE 11

| | Composition | Solution time [hr] | Density [g/cm$^3$] | (BH) max [kJ/m$^3$] | Hcj [kA/m] | Amount of Cu on cell interface [mass %] | Amount of Zr on cell interface [mass %] |
|---|---|---|---|---|---|---|---|
| Example 30 | Sm$_{26.0}$Fe$_{22.5}$Cu$_{3.85}$Zr$_{2.50}$Co$_{bal}$ | 2.0 | 8.32 | 255 | 1608 | 17 | 6 |
| Example 31 | Sm$_{26.0}$Fe$_{22.5}$Cu$_{3.85}$Zr$_{2.50}$Co$_{bal}$ | 10.0 | 8.34 | 259 | 1645 | 36 | 9 |
| Example 32 | Sm$_{26.0}$Fe$_{22.5}$Cu$_{3.85}$Zr$_{2.50}$Co$_{bal}$ | 30.0 | 8.34 | 260 | 1728 | 29 | 11 |
| Comparative Example 27 | Sm$_{26.0}$Fe$_{22.5}$Cu$_{3.85}$Zr$_{2.50}$Co$_{bal}$ | 1.0 | 8.32 | 252 | 1555 | 10 | 3 |

TABLE 11-continued

| | Composition | Solution time [hr] | Density [g/cm$^3$] | (BH) max [kJ/m$^3$] | Hcj [kA/m] | Amount of Cu on cell interface [mass %] | Amount of Zr on cell interface [mass %] |
|---|---|---|---|---|---|---|---|
| Comparative Example 28 | Sm$_{26.0}$Fe$_{22.5}$Cu$_{3.85}$Zr$_{2.50}$Co$_{bal}$ | 40.0 | 8.24 | 254 | 1630 | 24 | 21 |

TABLE 12

| | Occurrence of Reverse Magnetic Domain |
|---|---|
| Example 30 | occurred only in one side of cross section of crystal grain boundary |
| Example 31 | occurred only in one side of cross section of crystal grain boundary |
| Example 32 | occurred only in one side of cross section of crystal grain boundary |
| Comparative Example 27 | occurred in crystal grain boundary and inside crystal grain |
| Comparative Example 28 | occurred in crystal grain boundary and inside crystal grain |

In the solution treatment step S26, the temperature of the molded body was dropped to a solution temperature of 1170° C., and solution treatment was performed in the conditions with a solution temperature of 1170° C. and the solution treatment time shown in Table 11.

In the comparative examples 27 and 28, just like in the examples 30 to 32, rare earth-cobalt permanent magnet were produced by the same method as the method of producing the rare earth-cobalt permanent magnet according to the second embodiment described above (see FIG. 16) and under the same conditions as in the examples 30 to 32, except for the solution treatment step S26. In a step corresponding to the solution treatment step S26 in the production method according to the comparative examples 27 and 28, the temperature of the molded body was dropped to a solution temperature of 1170° C., and solution treatment was performed in the conditions with a solution temperature of 1170° C. and the solution treatment time shown in Table 11.

The density and the magnetic properties in the examples 30 to 32 and the comparative examples 27 and 28 were measured, just like in the examples 21 to 23. Measured results are shown in Table 11. Further, the magnetic domain structures of the sectional structures in the examples 30 to 32 and the comparative examples 27 and 28 were observed by use of an optical microscope using the magnetic Kerr effect. Observed results are shown in Table 12.

As shown in Table 11, the permanent magnets in the examples 30 to 32 had a density of 8.25 g/cm$^3$ or more, a maximum energy product (BH)max of 255 kJ/m$^3$ or more, and a coercive force Hcj of 1600 kA/m or more. When a magnetic field was applied to the permanent magnets in the examples 30 to 32, a reverse magnetic domain occurred only from one side of the cross section of the crystal grain boundary, and it propagated into the grain. One reason would be because the solution time was within the range of 2 to 30 hours. To be specific, good magnetic properties are expected to be obtained when the solution time is 2 hours or longer because homogenization progresses, and when the solution time is 30 hours or shorter because Sm is less likely to evaporate.

On the other hand, the permanent magnets in the comparative examples 27 and 28 did not satisfy all of a density of 8.25 g/cm$^3$ or more, a maximum energy product (BH)max of 255 kJ/m$^3$ or more, and a coercive force Hcj of 1600 kA/m or more. Further, when a magnetic field was applied to the permanent magnets in the comparative examples 27 and 28, a reverse magnetic domain occurred not only from one side of the cross section of the crystal grain boundary but also occurred inside the grain, and they propagated into the crystal grain and another part in the grain. One reason would be because the solution time was shorter than 2 hours or longer than 30 hours.

Experiment 8

Hereinafter, experiments conducted for examples 33 to 35 regarding the permanent magnet according to the second embodiment and comparative examples 29 and 30 are described with reference to Tables 13 and 14 below.

In the examples 33 to 35, rare earth-cobalt permanent magnet were produced by the same method as the method of producing the rare earth-cobalt permanent magnet according to the second embodiment described above (see FIG. 16) and under the same conditions as in the example 22, except for the material combining step S21, the solution treatment step S26 and the rapid cooling step S27.

The target composition in the material combining step S21 in the example 33 to 35 is shown in Table 13. As shown in Table 13, the target composition in the examples 33 to 35 contains 25.5 mass % R(Sm), 24.0 mass % Fe, 3.50 mass % Cu, 1.85 mass % Zr, and the remainder CO.

TABLE 13

| | Composition | Rapid cooling rate [° C./min] | Density [g/cm$^3$] | (BH) max [kJ/m$^3$] | Hcj [kA/m] | Amount of Cu on cell interface [mass %] | Amount of Zr on cell interface [mass %] |
|---|---|---|---|---|---|---|---|
| Example 33 | Sm$_{25.5}$Fe$_{24.0}$Cu$_{3.50}$Zr$_{1.85}$Co$_{bal}$ | 60 | 8.33 | 262 | 1658 | 20 | 10 |
| Example 34 | Sm$_{25.5}$Fe$_{24.0}$Cu$_{3.50}$Zr$_{1.85}$Co$_{bal}$ | 70 | 8.33 | 263 | 1773 | 30 | 16 |
| Example 35 | Sm$_{25.5}$Fe$_{24.0}$Cu$_{3.50}$Zr$_{1.85}$Co$_{bal}$ | 80 | 8.33 | 264 | 1888 | 35 | 15 |
| Comparative Example 29 | Sm$_{25.5}$Fe$_{24.0}$Cu$_{3.50}$Zr$_{1.85}$Co$_{bal}$ | 40 | 8.31 | 254 | 1460 | 4 | 2 |

TABLE 13-continued

| | Composition | Rapid cooling rate [° C./min] | Density [g/cm$^3$] | (BH) max [kJ/m$^3$] | Hcj [kA/m] | Amount of Cu on cell interface [mass %] | Amount of Zr on cell interface [mass %] |
|---|---|---|---|---|---|---|---|
| Comparative Example 30 | Sm$_{25.5}$Fe$_{24.0}$Cu$_{3.50}$Zr$_{1.85}$Co$_{bal}$ | 50 | 8.32 | 257 | 1529 | 13 | 7 |

TABLE 14

| | Occurrence of Reverse Magnetic Domain |
|---|---|
| Example 33 | occurred only in one side of cross section of crystal grain boundary |
| Example 34 | occurred only in one side of cross section of crystal grain boundary |
| Example 35 | occurred only in one side of cross section of crystal grain boundary |
| Comparative Example 29 | occurred in crystal grain boundary and inside crystal grain |
| Comparative Example 30 | occurred in crystal grain boundary and inside crystal grain |

In the solution treatment step S26, the temperature of the molded body was dropped to a solution temperature of 1170° C., and solution treatment was performed in the conditions with a solution temperature of 1170° C. and a solution treatment time of 5 hours.

In the rapid cooling step S27, the solution-treated molded body was cooled to reduce the temperature of the molded body. The molded body was rapidly cooled at the cooling rate shown in Table 13 in the range where the temperature of the molded body was 1000° C. to 600° C.

In the comparative examples 29 and 30, just like in the examples 33 to 35, rare earth-cobalt permanent magnet were produced by the same method as the method of producing the rare earth-cobalt permanent magnet according to the second embodiment described above (see FIG. 16) and under the same conditions as in the examples 33 to 35, except for the rapid cooling step S27. In a step corresponding to the rapid cooling step S27 in the production method according to the comparative examples 29 and 30, the solution-treated molded body was cooled to reduce the temperature of the molded body. The molded body was rapidly cooled at the cooling rate shown in Table 13 in the range where the temperature of the molded body was 1000° C. to 600° C.

The density and the magnetic properties in the examples 33 to 35 and the comparative examples 29 and 30 were measured, just like in the examples 21 to 23. Measured results are shown in Table 13. Further, the magnetic domain structures of the sectional structures in the examples 33 to 35 and the comparative examples 29 and 30 was observed by use of an optical microscope using the magnetic Kerr effect. Observed results are shown in Table 14.

As shown in Table 13, the permanent magnets in the examples 33 to 35 had a density of 8.25 g/cm$^3$ or more, a maximum energy product (BH)max of 255 kJ/m$^3$ or more, and a coercive force Hcj of 1600 kA/m or more. When a magnetic field was applied to the permanent magnets in the examples 33 to 35, a reverse magnetic domain occurred only from one side of the cross section of the crystal grain boundary, and it propagated into the grain. One reason would be because the rapid cooling rate was 60° C./min or higher. To be specific, good magnetic properties are expected to be obtained when the rapid cooling rate is 60° C./min or higher because the structure, or the crystal structure in particular, hardly varies when the temperature drops.

On the other hand, the permanent magnets in the comparative examples 29 and 30 did not satisfy all of a density of 8.25 g/cm$^3$ or more, a maximum energy product (BH)max of 255 kJ/m$^3$ or more, and a coercive force Hcj of 1600 kA/m or more. Further, when a magnetic field was applied to the permanent magnets in the comparative examples 29 and 30, a reverse magnetic domain occurred not only from one side of the cross section of the crystal grain boundary but also occurred inside the grain, and they propagated into the crystal grain and another part in the grain. One reason would be because the rapid cooling rate was lower than 60° C./min.

Experiment 9

Hereinafter, experiments conducted for examples 36 to 38 regarding the permanent magnet according to the second embodiment and comparative examples 31 and 32 are described with reference to Tables 15 and 16 below.

In the examples 36 to 38, rare earth-cobalt permanent magnet were produced by the same method as the method of producing the rare earth-cobalt permanent magnet according to the second embodiment described above (see FIG. 16) and under the same conditions as in the example 22, except for the material combining step S21, the sintering step S25, the solution treatment step S26, and the rapid cooling step S27.

The target composition in the material combining step S21 in the example 36 to 38 is shown in Table 15. As shown in Table 15, the target composition in the examples 36 to 38 contains 23.0 mass % R(Sm), 24.0 mass % Fe, 4.00 mass % Cu, 1.50 mass % Zr, and the remainder Co.

TABLE 15

| | Composition | Degree of vacuum [Pa] | Density [g/cm$^3$] | (BH)max [kJ/m$^3$] | Hcj [kA/m] | Amount of Cu on cell interface [mass %] | Amount of Zr on cell interface [mass %] |
|---|---|---|---|---|---|---|---|
| Example 36 | Sm$_{23.0}$Fe$_{24.0}$Cu$_{4.00}$Zr$_{1.50}$Co$_{bal}$ | 10 | 8.28 | 263 | 1832 | 30 | 10 |
| Example 37 | Sm$_{23.0}$Fe$_{24.0}$Cu$_{4.00}$Zr$_{1.50}$Co$_{bal}$ | 1 | 8.33 | 266 | 1850 | 31 | 10 |
| Example 38 | Sm$_{23.0}$Fe$_{24.0}$Cu$_{4.00}$Zr$_{1.50}$Co$_{bal}$ | 0.1 | 8.37 | 268 | 1847 | 33 | 10 |

TABLE 15-continued

| | Composition | Degree of vacuum [Pa] | Density [g/cm$^3$] | (BH)max [kJ/m$^3$] | Hcj [kA/m] | Amount of Cu on cell interface [mass %] | Amount of Zr on cell interface [mass %] |
|---|---|---|---|---|---|---|---|
| Comparative Example 31 | Sm$_{23.0}$Fe$_{24.0}$Cu$_{4.00}$Zr$_{1.50}$Co$_{bal}$ | 100 | 8.23 | 258 | 1910 | 27 | 5 |
| Comparative Example 32 | Sm$_{23.0}$Fe$_{24.0}$Cu$_{4.00}$Zr$_{1.50}$Co$_{bal}$ | 100000 | 8.15 | 246 | 1964 | 25 | 3 |

TABLE 16

| | Occurrence of Reverse Magnetic Domain |
|---|---|
| Example 36 | occurred only in one side of cross section of crystal grain boundary |
| Example 37 | occurred only in one side of cross section of crystal grain boundary |
| Example 38 | occurred only in one side of cross section of crystal grain boundary |
| Comparative Example 31 | occurred in crystal grain boundary and inside crystal grain |
| Comparative Example 32 | occurred in crystal grain boundary and inside crystal grain |

In the sintering step S25, sintering was performed at a sintering temperature of 1200° C. for a sintering time of 1.0 hour under a vacuum atmosphere with the degree of vacuum shown in Table 15.

In the solution treatment step S26, the temperature of the molded body was dropped to a solution temperature of 1170° C., and solution treatment was performed at a solution temperature of 1170° C. and a solution treatment time of 5 hours under a vacuum atmosphere with the degree of vacuum shown in Table 15.

In the comparative examples 31 and 32, just like in the examples 36 to 38, rare earth-cobalt permanent magnet were produced by the same method as the method of producing the rare earth-cobalt permanent magnet according to the second embodiment described above (see FIG. 16) and under the same conditions as in the examples 36 to 38, except for the sintering step S25 and the solution treatment step S26. In a step corresponding to the sintering step S25, sintering was performed in the conditions with a sintering temperature of 1200° C. and a sintering time of 1.0 hour under a vacuum atmosphere with the degree of vacuum shown in Table 15. In a step corresponding to the solution treatment step S26, the temperature of the molded body was dropped to a solution temperature of 1170° C., and solution treatment was performed in the conditions with a solution temperature of 1170° C. and a solution treatment time of 5 hours under a vacuum atmosphere with the degree of vacuum shown in Table 15.

The density and the magnetic properties in the examples 36 to 38 and the comparative examples 31 and 32 were measured, just like in the examples 21 to 23. Measured results are shown in Table 15. Further, the magnetic domain structures of the sectional structures in the examples 36 to 38 and the comparative examples 31 and 32 were observed by use of an optical microscope using the magnetic Kerr effect. Observed results are shown in Table 16.

As shown in Table 13, the permanent magnets in the examples 36 to 38 had a density of 8.25 g/cm$^3$ or more, a maximum energy product (BH)max of 255 kJ/m$^3$ or more, and a coercive force Hcj of 1600 kA/m or more. When a magnetic field was applied to the permanent magnets in the examples 36 to 38, a reverse magnetic domain occurred only from one side of the cross section of the crystal grain boundary, and it propagated into the grain. One reason would be because the degree of vacuum under a vacuum atmosphere in the sintering step S25 and the solution treatment step S26 was 10 Pa or lower. To be specific, a decrease in density is expected to be suppressed when the degree of vacuum is 10 Pa or lower.

On the other hand, the permanent magnets in the comparative examples 31 and 32 did not satisfy all of a density of 8.25 g/cm$^3$ or more, a maximum energy product (BH)max of 255 kJ/m$^3$ or more, and a coercive force Hcj of 1600 kA/m or more. Further, when a magnetic field was applied to the permanent magnets in the comparative examples 31 and 32, a reverse magnetic domain occurred not only from one side of the cross section of the crystal grain boundary but also occurred inside the grain, and they propagated into the crystal grain and another part in the grain. One reason would be because the degree of vacuum under a vacuum atmosphere in the sintering step S25 and the solution treatment step S26 exceeded 10 Pa.

Although the embodiments and examples of the present invention are described in the foregoing, the present invention is not restricted to the above-described embodiments and the examples, and various changes, modifications and combinations as would be obvious to one skilled in the art may be made without departing from the scope of the invention.

This application is based upon and claims the benefit of priority from Japanese patent application No. 2015-200085 filed on Oct. 8, 2015, the disclosure of which is incorporated herein in its entirety by reference.

REFERENCE SIGNS LIST

10 RARE EARTH-COBALT PERMANENT MAGNET
1, 21 CRYSTAL GRAIN
2, 22 GRAIN BOUNDARY

The invention claimed is:

1. A rare earth-cobalt permanent magnet containing 23 to 27 mass % R, 3.5 to 5.0 mass % Cu, 18 to 25 mass % Fe, 1.5 to 3.0 mass % Zr, and a remainder Co with inevitable impurities, where R is Sm and optionally additional rare earth elements, wherein the rare earth-cobalt permanent magnet has a metal structure including a plurality of crystal grains and a grain boundary, the grain boundary has a continuously extending shape, a content of Cu in the grain boundary is higher than a content of Cu in the crystal grains, a content of Zr in the grain boundary is higher than a content of Zr in the crystal grains, the grain boundary contains 6 to 20 mass % Zr; and wherein in a magnetic field, a reverse magnetic domain occurs only from one side of a cross section of the grain boundary and propagates into the crystal grains.

2. The rare earth-cobalt permanent magnet according to claim 1, wherein the grain boundary contains 5 to 45 mass % Cu.

3. The rare earth-cobalt permanent magnet according to claim 1, wherein when a specified applied magnetic field is applied in a demagnetizing field and the applied magnetic field is gradually increased, a magnetic wall comes into existence in a boundary between the plurality of crystal grains, and wherein when the applied magnetic field continues to be gradually increased and the applied magnetic field exceeds a critical magnetic field, the magnetic wall propagates into the crystal grain, and the critical magnetic field is equal to or more than 480 kA/m.

4. The rare earth-cobalt permanent magnet according to claim 1, wherein an inherent coercive force is equal to or more than 1600 kA/m.

5. The rare earth-cobalt permanent magnet according to claim 1, wherein, among inevitable impurities, C is restricted to 200 to 1000 ppm by mass.

6. The rare earth-cobalt permanent magnet according to claim 1, wherein, among inevitable impurities, O is restricted to 1000 to 5000 ppm by mass.

7. The rare earth-cobalt permanent magnet according to claim 4, wherein a density is equal to or more than 8.25 g/cm$^3$, and a maximum energy product is equal to or more than 255 kJ/m$^3$.

8. A motor using the rare earth-cobalt permanent magnet according to claim 1.

9. A device using the rare earth-cobalt permanent magnet according claim 1.

10. The rare earth-cobalt permanent magnet according to claim 2, wherein when a specified applied magnetic field is applied in a demagnetizing field and the applied magnetic field is gradually increased, a magnetic wall comes into existence in a boundary between the plurality of crystal grains, and wherein when the applied magnetic field continues to be gradually increased and the applied magnetic field exceeds a critical magnetic field, the magnetic wall propagates into the crystal grain, and the critical magnetic field is equal to or more than 480 kA/m.

11. The rare earth-cobalt permanent magnet according to claim 2, wherein an inherent coercive force is equal to or more than 1600 kA/m.

12. The rare earth-cobalt permanent magnet according to claim 2, wherein, among inevitable impurities, C is restricted to 200 to 1000 ppm by mass.

13. The rare earth-cobalt permanent magnet according to claim 2, wherein, among inevitable impurities, O is restricted to 1000 to 5000 ppm by mass.

14. The rare earth-cobalt permanent magnet according to claim 11, wherein a density is equal to or more than 8.25 g/cm$^3$, and a maximum energy product is equal to or more than 255 kJ/m$^3$.

15. A motor using the rare earth-cobalt permanent magnet according to claim 2.

16. A device using the rare earth-cobalt permanent magnet according to claim 2.

* * * * *